United States Patent [19]

Armstrong

[11] Patent Number: 4,554,411
[45] Date of Patent: Nov. 19, 1985

[54] INTERCOM SYSTEM
[75] Inventor: William E. Armstrong, Cincinnati, Ohio
[73] Assignee: Scovill Inc., Waterbury, Conn.
[21] Appl. No.: 460,615
[22] Filed: Jan. 24, 1983
[51] Int. Cl.[4] .............................................. H04M 9/08
[52] U.S. Cl. .................................. 179/37; 179/81 B; 179/99 A; 340/384 E
[58] Field of Search ..................... 179/2 C, 37, 38, 39, 179/40, 81 B, 84 T, 99 A, 99 LC, 100 L, 170 NC; 340/384 E; 381/93, 110

[56] References Cited

U.S. PATENT DOCUMENTS

| | | |
|---|---|---|
| 2,496,398 | 2/1950 | Lambert . |
| 2,759,179 | 8/1956 | Kircher . |
| 2,802,055 | 8/1957 | Wildhagen . |
| 3,283,075 | 11/1966 | Moore . |
| 3,400,218 | 9/1968 | Sibley . |
| 3,499,115 | 3/1970 | Sontag . |
| 3,530,245 | 9/1970 | Berns . |
| 3,594,786 | 7/1971 | Brunner-Schwer et al. . |
| 3,763,326 | 10/1973 | Murto et al. . |
| 3,849,603 | 11/1974 | Proios . |
| 3,870,829 | 3/1975 | Chacon ................................. 179/38 |
| 3,904,834 | 9/1975 | Shinoi et al. . |
| 4,024,345 | 5/1977 | Kochem . |
| 4,055,729 | 10/1977 | Vandling ............................ 179/2 C |
| 4,073,133 | 2/1978 | Earls et al. ........................ 340/384 E |
| 4,086,447 | 4/1978 | Schindler et al. ............ 179/170 NC |
| 4,097,690 | 6/1978 | Kuntz et al. ......................... 179/37 X |
| 4,101,735 | 7/1978 | Bridenbaugh ..................... 179/81 B |
| 4,110,750 | 8/1978 | Heyning et al. ................. 340/384 E |
| 4,132,869 | 1/1979 | Knox ..................................... 179/38 |
| 4,140,879 | 2/1979 | Heffernan ........................ 179/2 C X |
| 4,158,112 | 6/1979 | Cerbone et al. .................... 179/99 A |
| 4,196,317 | 4/1980 | Bartelink ........................... 179/99 A |
| 4,203,006 | 5/1980 | Mascia ................................. 179/2 C |
| 4,309,573 | 1/1982 | Grantland et al. . |
| 4,320,682 | 3/1982 | Schreier . |
| 4,329,543 | 5/1982 | Danford ............................... 179/37 |
| 4,467,142 | 8/1984 | Rupp et al. . |
| 4,485,273 | 11/1984 | Bartelink ....................... 179/99 A X |

FOREIGN PATENT DOCUMENTS 54-136252 10/1979 Japan ........................... 179/170 NC

OTHER PUBLICATIONS

M. A. Patten, "Electronic Line Pack with Opto-Electronic Line Isolation," *IBM Technical Disclosure Bulletin*, vol. 20, No. 1, pp. 375-376, Jun. 1977.
Technicom International, Inc., *Homefone: Smarten Your Home by Phone*, Brochure, Postmarked Mar. 25, 1983.
Drawing—Nutone Model IM-406; 6-Wire Radio/Intercom Master Unit; Nutone Scovill, Cincinnati, Oh.
Drawing—I-614, Nutone Scovill, Cincinnati, Oh., Drawn, 12-20-79.

*Primary Examiner*—Keith E. George
*Attorney, Agent, or Firm*—Bernard, Rothwell & Brown

[57] ABSTRACT

A communication system includes a master control with optional inside, door or patio remote units, door chime, phone coupler, or programming such as radio, phonograph, tape player or the like. The inside remote units and the master control are connected to common lines including an audio line, control line, and talk-listen line. The remote units signal the master control on the control line by one of five voltage levels selected by depressing intercom talk, door talk, phone talk, or end-call push button switches. Tri-state signals on the talk-listen line from the master control operation of speaker circuits and microphone circuits in the units wherein the units other than the calling unit are automatically operated for hands-free answering during a timer period after release of an intercom talk switch. Phone ringing signals are broadcast, and depressing the phone talk switch causes the audio line to be coupled to the telephone line permitting the unit with the phone switch depressed to talk to the telephone caller whose response is broadcast on the indoor units during the timing period after the release of the switch. A chime circuit generates electronic chime signals with both rise and fall times.

14 Claims, 15 Drawing Figures

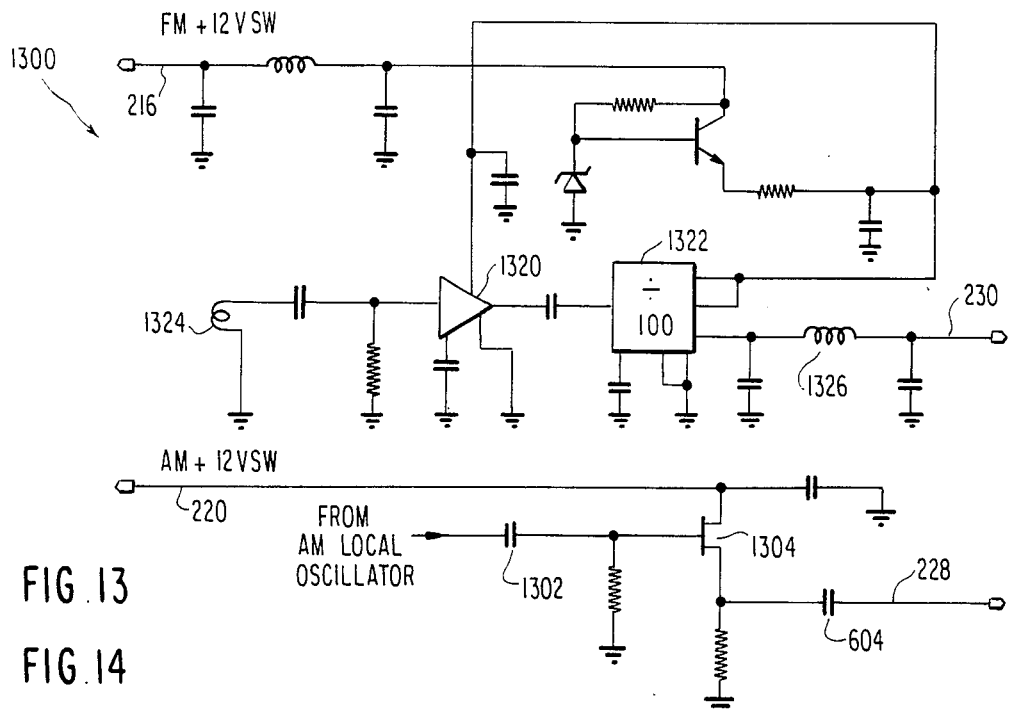
FIG.13
FIG.14
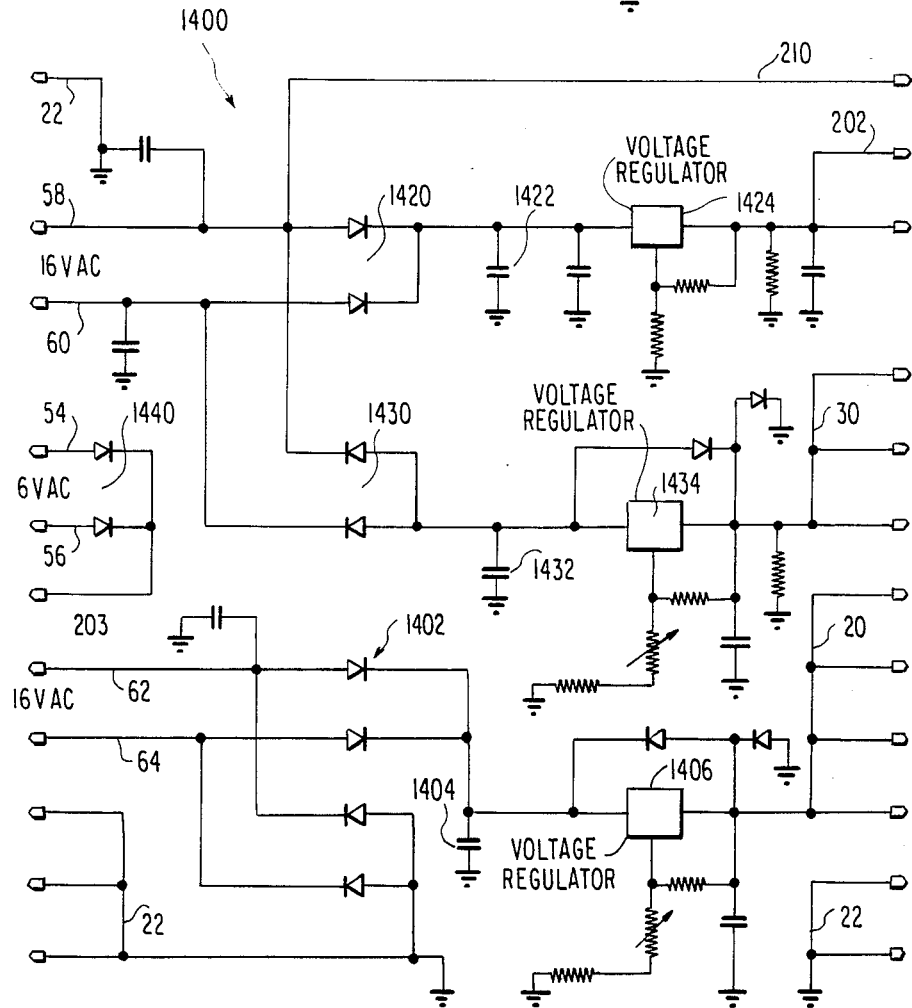

INTERCOM SYSTEM

BACKGROUND

1. Field of the Invention

The present invention relates to communication systems which may be employed in buildings or homes.

2. Description of the Prior Art

The prior art contains a number of communication systems which may be employed in buildings and homes in which a calling party may page another party who may then respond to the call. The prior art systems generally have one or more deficiencies such as complexity, requiring multiple wiring circuits, being excessively expensive, etc.

SUMMARY OF THE INVENTION

In accordance with one aspect of the invention, a communication system includes a master control unit and a plurality of station units which are all connected to a plurality of common lines including an audio line, a control line and a talk-listen line. Operation of a talk switch at one of the units causes that unit to operate as a microphone generating audio signals on the audio line which are broadcast by the other units. Operation of the talk switch also produces a signal on the control line, and the master control unit at the termination of this signal generates a signal on the talk-listen line which causes the units other than the calling unit to operate as microphones thus enabling the units to respond without operation of a switch. A latch within the calling unit is set by the talk switch to operate the calling unit as a speaker to broadcast the response.

In another aspect of the invention, a master control unit includes a timer which is initiated by release of the talk switch at a calling station for controlling operation of one or more other stations as microphones permitting hands-free response during an answerback period determined by the times.

In a further aspect, units may include end of call switches for terminating an answerback period.

In still another aspect of the invention, intercom units generate analog signals on a control line wherein the signals have a magnitude corresponding to a selected one of the switches operated in the unit. The voltage magnitude on the control line is detected by analog-to-digital detector means in the master control unit for operating various functions of the system.

In a still further aspect of the invention, a communication system may include input and output lines for being coupled to telephone lines. A parallel arrangement of a first optical isolator and a variable impedance which includes a second optical isolator is connected across the telephone lines by a relay when a phone talk switch is operated in a unit. The first optical isolator includes a light generating diode connected across the telephone lines and optically coupled to a light sensitive transistor for transfering incoming telephone signals to output signals on the output. The light generating diode of the second optical isolator is connected to the input and its light sensitive transistor is coupled in the impedance to produce a variable impedance across the telephone lines mimicking a conventional microphone.

When a telephone instrument is taken off hook, a current in the telephone lines is detected to disable the relay means and disconnect the communication system from the telephone lines.

Optionally a communication system in accordance with the invention may include a chime circuit wherein a variable tone oscillator is controlled by the output of a counter for producing different selected tones. Variable output amplifier for the chime circuit has a first capacitance in parallel with the voltage input for controlling rise time of the amplifier output, includes a second capacitance in series with the voltage input for controlling decay time of the amplifier output. The second capacitance is discharged during each count whereby the chime circuit has a sound closely resembling the sound produced by the striking of chimes.

In another option, the communication system can include door units which do not include control switches. In a particular aspect, a door unit includes a single microphone-speaker, and the master unit includes respective amplifiers for operating the door unit as a microphone and speaker, respectively. Respective electronic switches are operated by a control voltage and an inverted control voltage, respectively, for connecting the corresponding amplifiers to the door unit. In order to prevent noise during switching operations, a capacitance circuit is coupled between inputs of the corresponding switches to delay turning on of a switch during a discharge of the capacitance after the opposite switch has been turned off.

BRIEF DESCRIPTION OF THE DRAWINGS

FIG. 13 is a detailed schematic of the prescaler circuitry contained within the master control unit of FIG. 2.

FIG. 14 is a detailed schematic of a power supply circuit in the master control unit of FIG. 2.

DETAILED DESCRIPTION

Figure 1:
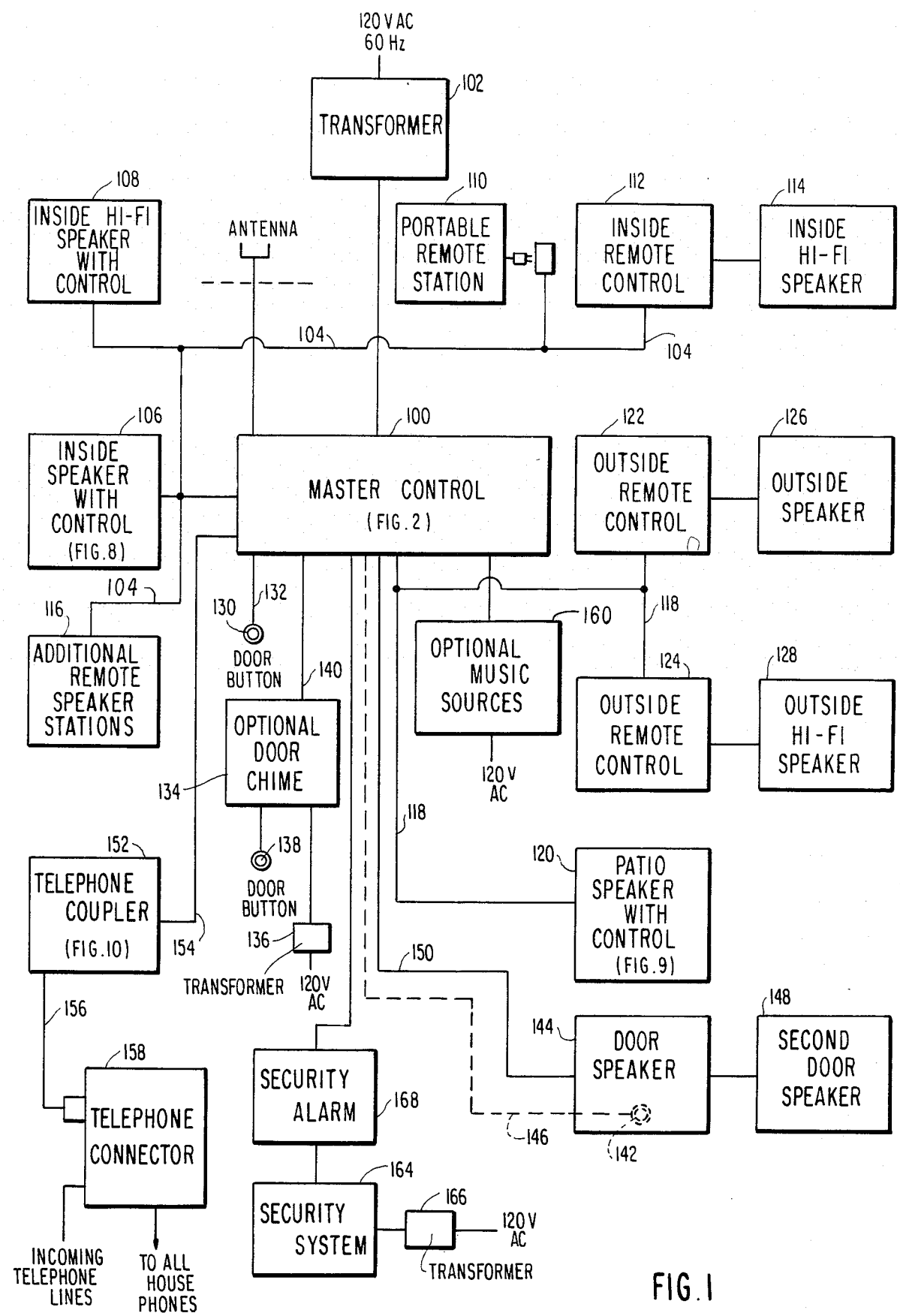
FIG. 1 is a block diagram of a communication system in accordance with the invention.

As illustrated in FIG. 1, a communication system in accordance with one embodiment of the invention includes a master control unit 100 which is energized by a transformer 102 and which is connected by a common six wire cable 104 to one or more inside remote units or stations such as inside speaker with control unit 106, inside hi-fi speaker with control unit 108, portable remote station 110, inside remote control unit 112 operating separately mounted inside hi-fi speaker 114, and possible additional remote speaker stations indicated by box 116. The cable 104 is a six wire cable such as three twisted pair, and can be loop wired and/or homerun wired to the inside stations. A similar six wire cable 118 connects the master control unit 100 to one or more outside remote units or stations such as patio speaker with control unit 120, and outside remote control units 122 and 124 which operate separately mounted outside speaker 126 and outside hi-fi speaker 128, respectively. In a normal mode any of the master control station 100, the inside stations 106, 108, 110, 112 and 114, and outside stations 120, 122, and 124 may be used to call or page all the other stations after which these other stations are activated to respond for a pre-set timing duration which can be extended or cut short.

Additionally, the communication system includes one or more door pushbuttons such as pushbutton 130 connected by paired line 132 to the master control 100 for activating the master control unit to broadcast a door chime from the master and all remote stations. Alternatively or additionally, a conventional door chime 134 energized by its own transformer 136 and operated by a door pushbutton 138 is connected by line pair 140 to the master control unit for broadcasting the door chime generated by unit 134 from all stations. Door pushbuttons can also be mounted in door speaker units, such as the pushbutton 142 mounted in door speaker unit 144 and connected by twisted pair line 146 to the master control unit 100. One or more door speakers, such as the door speaker 144 and a second door speaker 148 are connected by a twisted pair line 150 to the master unit 100 so that any of the stations 100, 106, 108, 110, 112, 116, 120, 122 and 124 can broadcast through the door speakers and thereafter the door speakers can be utilized as microphones to respond through all of the stations.

A telephone coupler circuit 152 is connected by a six line cable 154 to the master control unit 100. A cable 156 connects the coupler 152 to a telephone connector 158 which is serially connected with the incoming telephone lines upstream from the house phones so that the incoming TIP telephone line is routed through the telephone coupler 152 and the RING telephone line is connected to the telephone coupler 152. An incoming telephone ring signal is broadcast in all of the stations 100, 106, 108, 110, 112, 116, 120, 122 and 124. Any of these stations may be utilized to answer the telephone call, after which the response of the telephone caller is broadcast by all of the stations for the predetermined timing period which may be extended or cut short. A house phone going off hook terminates the broadcast of the telephone conversation through the stations.

The master control unit 100 also has the ability to broadcast program material from the stations. Such program material includes AM radio, FM radio, and other music sources indicated by the box 160 such as a record player, tape deck, etc. Further, a security system 164 energized by its own transformer 166 has a security alarm 168 which may be connected to the master control 100 for broadcasting an alarm through the stations.

Figure 4:
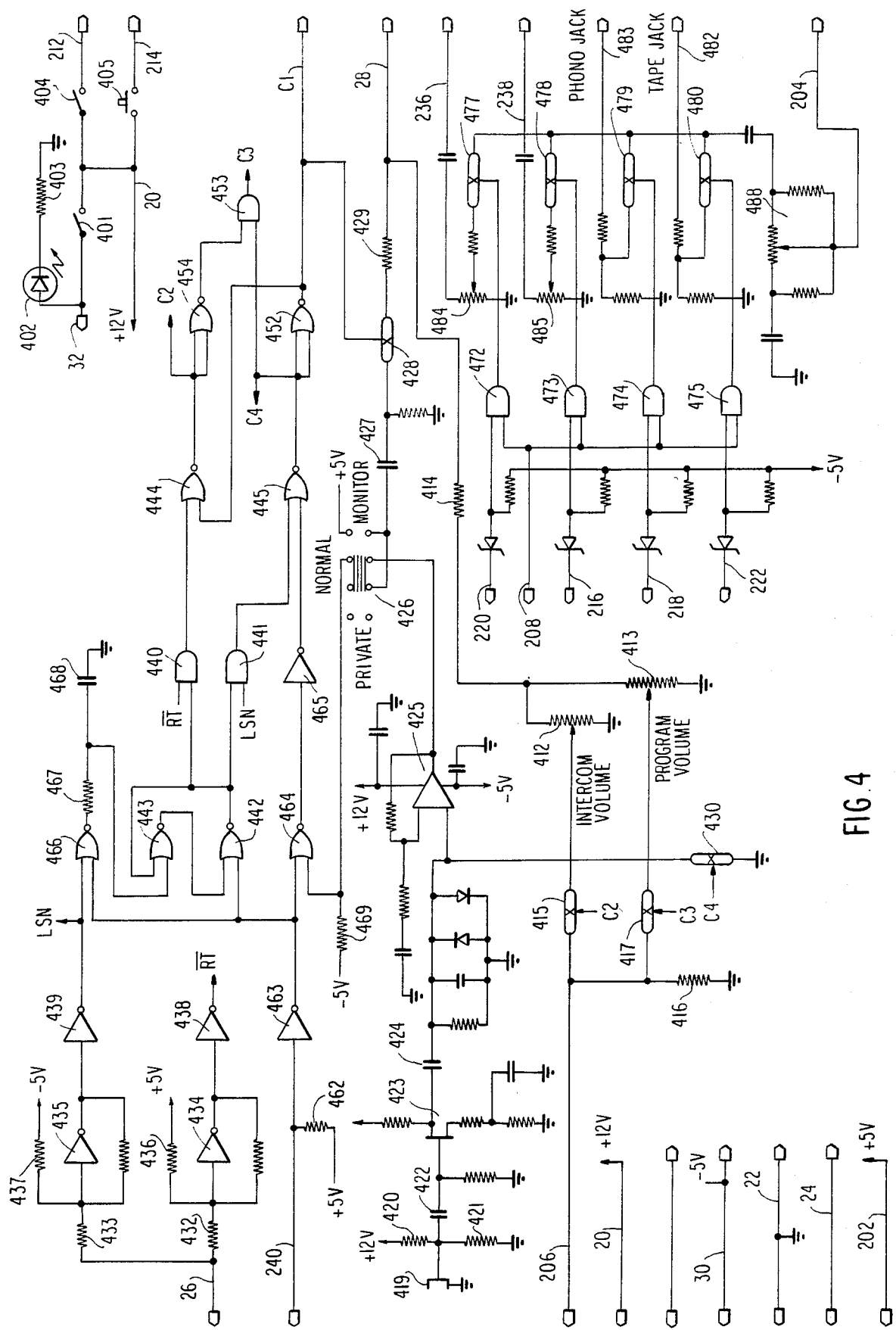
FIG. 4 is a detailed schematic of an intercom portion of the circuitry within the master control unit of FIG. 2.
Figure 6:
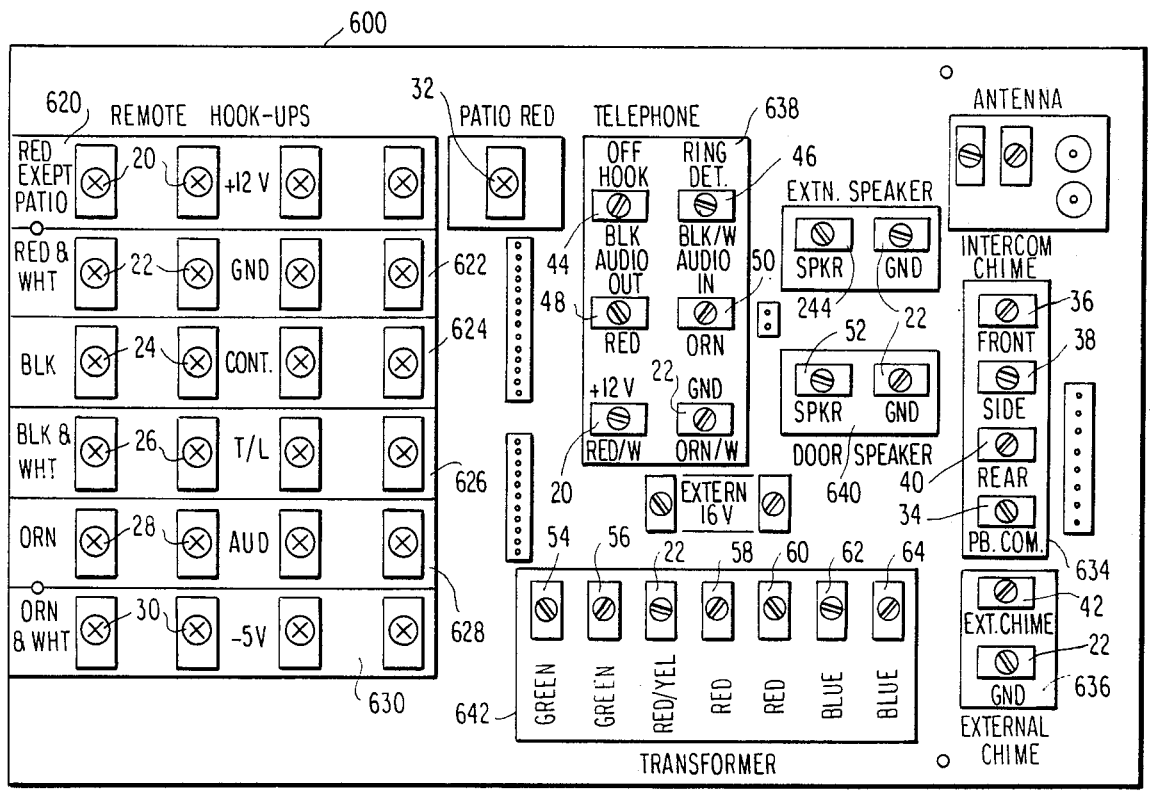
FIG. 6 is a plan view of a terminal board showing the connections to the master control unit of FIG. 2.

The lines constituting the cables 104, 118, 132, 140, 150 and 154 of FIG. 1 can be determined from the terminals shown on the terminal board 600 illustrated in FIG. 6. For ease in understanding the operation and structure of the circuitry, the reference numbers used to identify the terminals in FIG. 6 are also utilized to identify lines electrically connected to these terminals throughout the system. The terminal board 10 includes a terminal block 620 with four commonly connected terminals 20, a terminal block 622 with four commonly connected terminals 22, a terminal block 624 containing four commonly connected terminals 24, a terminal block 626 containing four commonly connected terminals 26, a terminal block 628 containing four commonly connected terminals 28 and a terminal block 630 containing four commonly connected terminals 30. The six lines constituting the cable 104, FIG. 1, are connected to the respective terminals 20, 22, 24, 26, 28 and 30. Lines connected to the terminals 20 supply +12 volts to all inside stations and various circuit portions, while lines 22 and 30 supply ground and −5 volts power to both inside and outside stations as well as other circuit portions. The line 24 is identified as a control line carrying user generated control signals from the stations to control circuitry in the master control unit. The line 26 is a talk-listen (T/L) line carrying control signals originated from the control circuitry in the master control unit for controlling operation of the station circuitry. The line 28 is a common audio line carrying all audio signals which are transmitted to or from the stations. The six lines constituting the cable 118 includes the lines 22, 24, 26, 28 and 30 and a patio +12 V power line 32. The line 32, as shown in FIG. 4, is connected to line 20 by a switch 401 so that the outside stations 120, 122 and 124, FIG. 1, can be deactivated by opening the switch 401. Conveniently a light-emitting diode 402 in series with a resistance 403 is connected between the line 32 in 403 within the master control unit for indicating whether the outside units are activated.

The twisted pair lines 132 and 146 from the door pushbuttons have common lines connected to a pushbutton common terminal 34 and have their other lines connected to respective front door terminal 36, side door terminal 38 and/or rear door terminal 40 in a terminal block 634 on the terminal board 600. The chime signal on line 140 from the electronic door chime circuit 134 is applied to external chime terminal 42 in a terminal block 636 which also contains a common or ground terminal 22 for the chime circuit. The door speaker twisted pair 150 is connected to terminals on a door speaker terminal block 640 which includes a speaker terminal 52, as well as a ground terminal 22.

The cable 154 from the telephone coupler of FIG. 1 is connected to terminals on a terminal block 638 of the terminal board 600, including an off-hook terminal 44, a ring set terminal 46, an audio-out terminal 48, and an audio-in terminal 50 in addition to 12 volt terminal 20 and ground terminal 22. The transformer 102, FIG. 1, has seven lines connected to terminals on terminal block 642 which includes in addition to a common terminal 22, a pair of 6 volt AC terminals 54 and 56, a first pair of 16 volt AC terminals 58 and 60 and a second pair of 16 volt AC terminals 62 and 64.

Each of the stations 100, 106, 108, 110, 112, 116, 122 and 124 contains four switches, an intercom-page (I/P) talk switch, a door talk switch, a phone talk switch and an end-call switch. These switches are illustrated for the master station 100 in FIG. 5 by push button switches 501–504; for the inside remote station 106 in FIG. 8 by pushbutton switches 801–804; and for outside remote station 120 in FIG. 9 by pushbutton switches 901–904. An operator depresses the I/P button when he wishes to broadcast from or page all the other stations. Upon release of the I/P switch the other stations are operated as inputs to the calling station for a predetermined timing period. The door talk switch is depressed when a caller wishes to broadcast from the door speakers, and release of the door talk switch converts the door speaker into a microphone for a predetermined duration to enable a reply; the conversation between the caller and the door is broadcast on all of the stations. The phone talk switch is depressed to answer the telephone, and similar to the door talk operation, the entire conversation is broadcast on all of the other stations. The end of call switch is utilized to cut short the predetermined timing period during which replies by other stations, the door, and phone caller are enabled. The operator must depress the appropriate button each time he wishes to speak on the system. If the reply exceeds the predetermined timing period, the corresponding push button switch must be momentarily depressed to reinitiate the timing period to enable the reply to continue to be broadcast to the calling station and, in case of door talk or phone talk, to the other stations.

Figure 2:
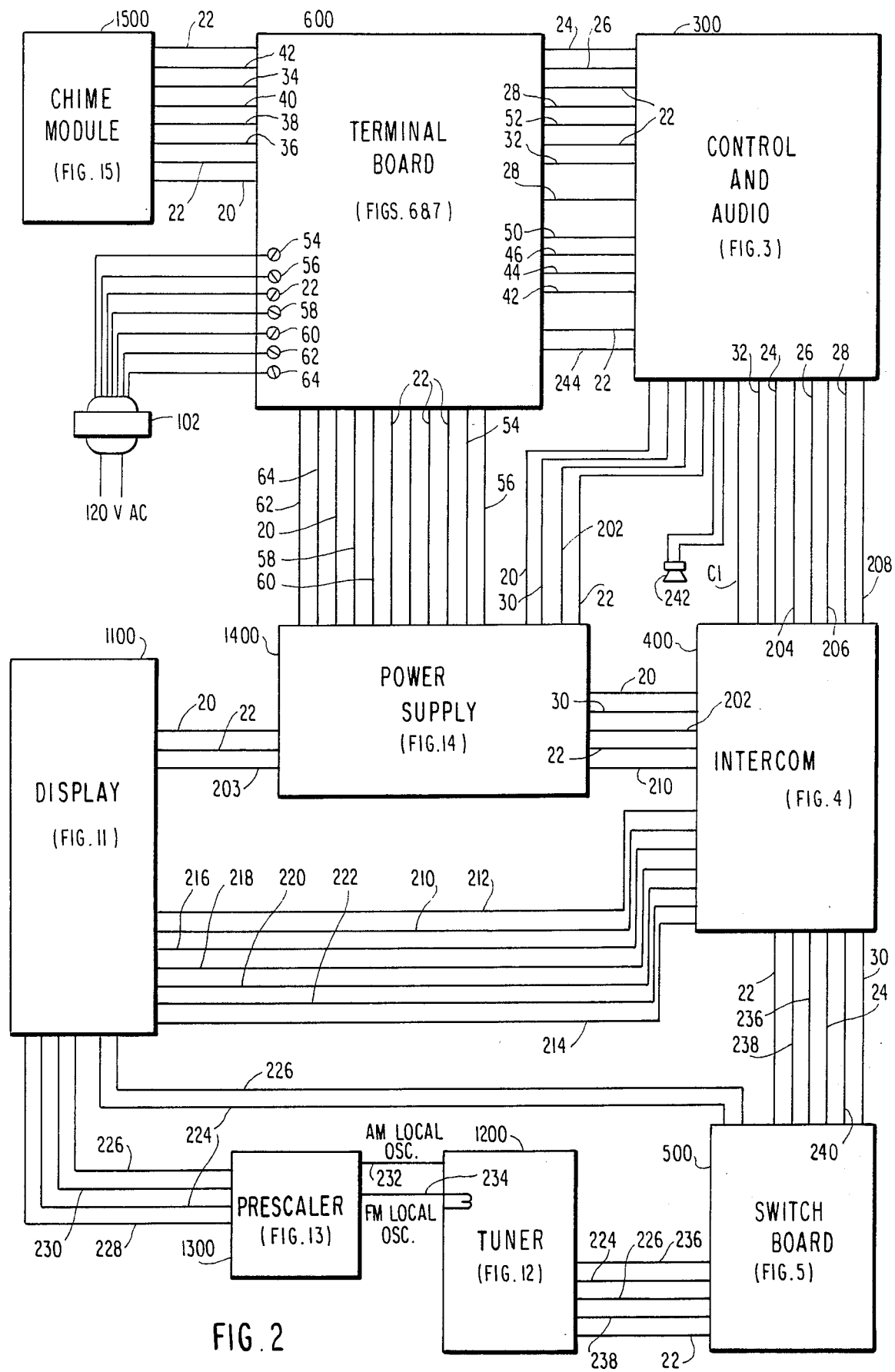
FIG. 2 is a block diagram of the circuitry within a master control unit in the system of FIG. 1.

As shown in FIG. 2, the electrical circuitry in the master control unit includes the terminal board 600 together with a control and audio circuit 300, an intercom circuit 400, a switchboard 500, a display circuit 1100, an AM/FM tuner circuit 1200, a prescaler circuit 1300, a power supply circuit 1400, and a chime module circuit 1500. These circuits are interconnected by groups of wires wherein some of the wires are identified by the numbers previously used to identify terminals of the terminal board in FIG. 6 to indicate that such wires are common with the terminals and/or electrically connected at one or more points within the electrical circuit. In addition to the lines connected to the remote stations, telephone coupler, door pushbuttons, and door speakers, the master unit includes several additional lines interconnecting the circuit boards thereof. Lines 202 provide a +5 V voltage from the power supply 1400 to the control and audio circuit 300 and intercom circuit 400. Program audio and audio amplifier signals are supplied on respective lines 204 and 206 by the intercom 400 to the control and audio circuit 300, and a mute signal is supplied by the control and audio circuit on line 208 to the intercom circuit 400. The power supply 1400 also supplies a 60 hertz clock signal on line 210 which is passed to the display circuit 1100 via the intercom circuit 400. The intercom circuit 400 produces a +12 V switching voltage on line 212 and select signals on 214 which are applied to the display circuit 1100 (in FIG. 4 see switch 404 and push button switch 405 producing the respective +12 V switch voltage on line 212 and select signals on line 214). Program audio control signals on lines 216, 218, 220 and 222 for FM, phono, AM and tape are supplied by the display circuit 1100 to the intercom circuit 400. The display circuit produces AM +12 V switching voltage and FM +12 V switching voltage on respective lines 224 and 226 which are applied to the prescaler circuit 1300 and to the tuner circuit 1200 via the switch board circuit 500. AM local oscillator signals on line 228 and appropriately divided FM local oscillator signals on line 230 are applied by the prescaler circuit 1300 to the display circuit 1100. AM and FM local oscillator pick-up lines 232 and 234 connect the prescaler circuit 1300 with the tuner 1200. AM audio signals on line 236 and FM audio signals on line 238 pass from the tuner 1200 to the intercom circuit 400 by the switchboard circuit 500. The switchboard circuit 500 generates a local talk signal on line 240 which is applied to the intercom circuit 400.

Figure 7:
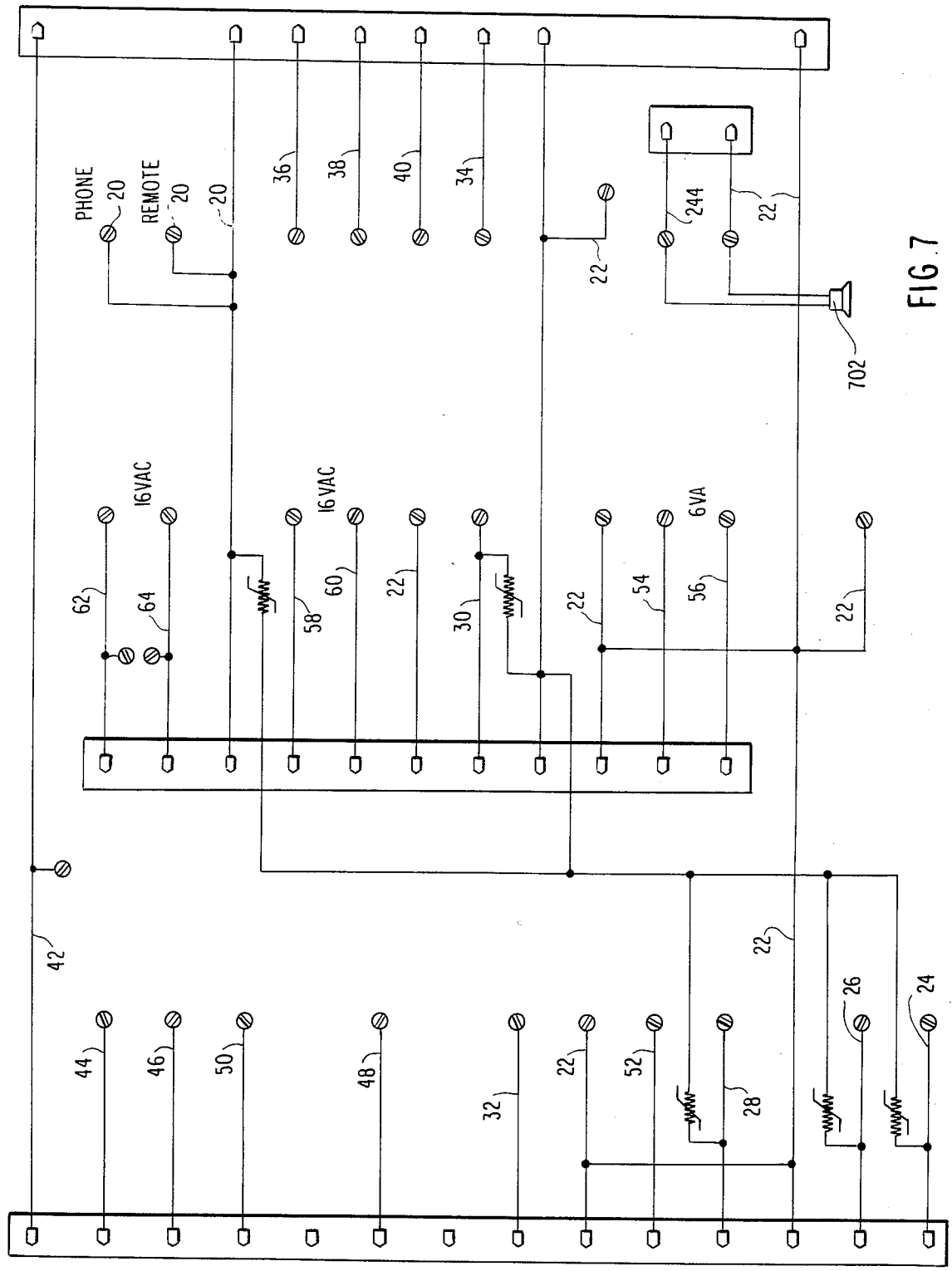
FIG. 7 is a schematic diagram of the interconnections made between the circuitry and the terminal board of the master control unit of FIG. 2.

The master station additionally includes an internal speaker 242 connected to the control and audio board 300. An optional external speaker 702, FIG. 7, may be connected to the control and audio circuit 300 by lines 22 and 244 through the terminal board 600.

Figure 3:
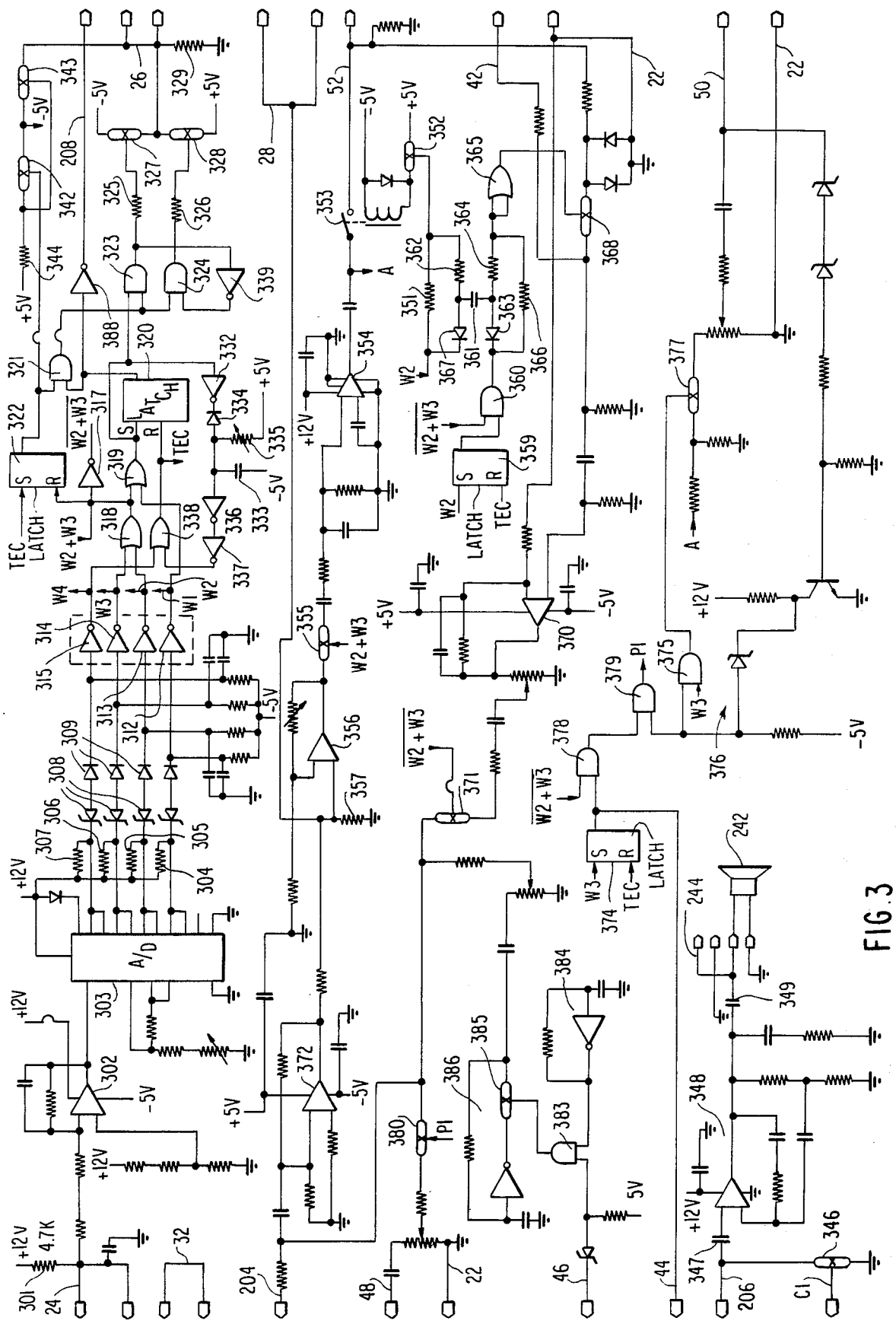
FIG. 3 is a detailed schematic of a control and audio portion of the circuitry within the control unit of FIG. 2.
Figure 5:
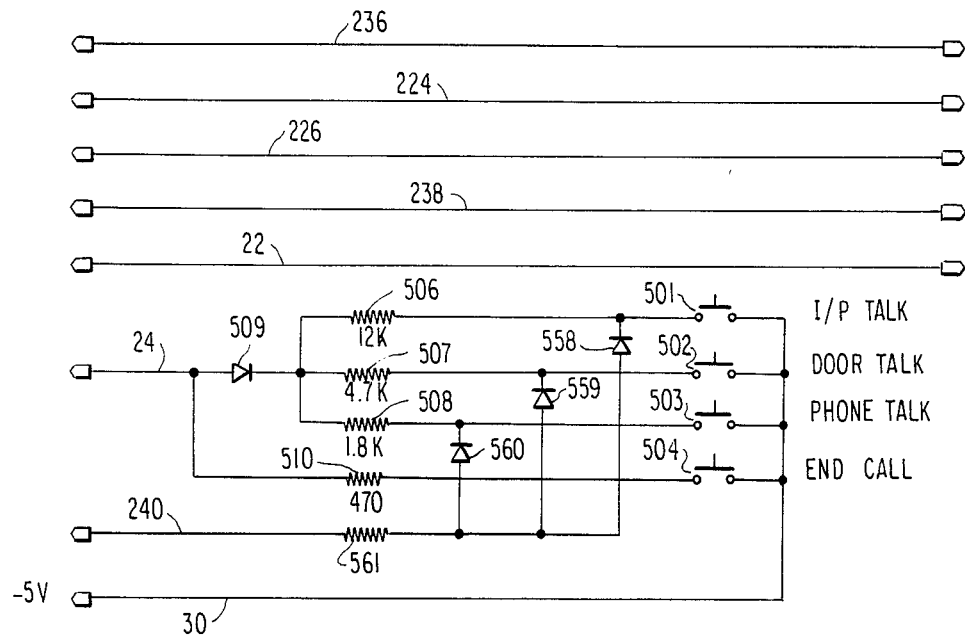
FIG. 5 is a detailed schematic of a switch portion of the circuitry within the master control unit of FIG. 2.

As shown in FIG. 5, operation of one of the push button switches 501, 502 and 503 connects a corresponding resistance 506, 507 or 508 in series with a diode 509 between the control line 24 and the −5 volt line 30. Similarly operation of the end-call push button switch 504 will connect a resistance 510 in series between the control line 24 and −5 volt line. As shown in FIG. 3, the control line 24 is biased by a resistance 301 connected to the +12 volt supply. The value of the resistances 506 (12K), 507 (4.7K), 508 (1.8K) and 510 (470K) are selected in conjunction with the value of the resistance 301 (4.7K) to produce selected voltage levels (7.4, 3.5, 0.17 and −3.5 volts) on the line 24 when the respective pushbutton switch 501, 502, 503 and 504 is depressed.

The control push buttons of the remote stations (801, 802, 803 and 804 of FIG. 8 and 901, 902, 903 and 904 of FIG. 9) are connected in series with respective identical value resistances (806, 807, 808 and 810 of FIG. 8 and 906, 907, 908 and 910 of FIG. 9) between −5 volts and the control line 24, the resistances 806, 807 and 808 being connected by diode 809 and the resistances 906, 907 and 908 being connected by diode 909 to line 24, for generating respective control voltages on the control line 24 similar to the pushbutton switches at the master station.

A voltage level converter 302 connects the control line 24 to the analog input of an analog to digital converter 303. The voltage level converter 302 and its associated resistances and capacitance are selected to convert the corresponding +7.4, 3.5, 0.17 and −3.5 volts on line 24 to 3.0, 5.0, 7.0 and 9.0 volts, respectively, at the analog to digital converter input. The outputs of the analog to digital converter 303 are connected together in pairs which are biased by respective resistances 304, 305, 306 and 307 connected to the +12 volt supply to normally apply positive voltages through zener diodes 308 and diodes 309 to inputs of respective inverters 312, 313, 314 and 315 which are biased negative by resistances connected to the −5 volt supply. The pairing of the outputs of the analog to digital converter increases the permissible input voltage variations attributable to component variation and line resistance. For example, when depression of one of the I/P talk push buttons 501, 801 and 901 results in a voltage within the range from 2 to 4 volts on the input of the analog to digital converter, the output W1 of inverter 312 goes positive. Similarly, the output W2 of inverer 313 goes high when the analog to digital converter input is in the range from 4 to 6 volts corresponding to depression of a door talk push button 502, 802 or 902; the output W3 of the inverter 314 goes high when the analog to digital converter input is in the range from 6 to 8 volts corresponding to depression of a phone talk push button 503, 803 or 903; and the output W4 of inverter 315 goes high when the analog to digital converter input is in the range from 8 to 10 volts corresponding to depression of an end of call push button switch 504, 804 or 904.

The outputs W2 and W3 of inverters 313 and 314 are connected to inputs of an OR gate 318 to produce an output W2+W3 which is inverted by inverter 317 to inverted W2+W3. The output W1 of the inverter 312 together with the output of the OR gate 318 are applied to inputs of an OR gate 319 which has its output connected to the set input of latch 320. The output of the latch 320 is connected to one input of an AND gate 321 which has its other input connected to the output of a latch 322 which is normally in a set condition. The output of the AND gate 321 is applied to first inputs of AND gates 323 and 324 which have their outputs connected by respective resistances 325 and 326 to inputs of respective normally closed analog switches 327 and 328. These switches control the application of −5 volts and +5 volts, respectively, to the T/L line 26 which is normally biased to ground or 0 potential through resistance 329. When line W1 goes high, by depression of an I/P talk push button, latch 320 is set producing a high output on gate 321 which enables gates 323 and 324. The high output from OR gate 319 applied to the second input of gate 323 produces a high output on gate 323 which operates analog switch 327 to apply a −5 volts to T/L line 26 to produce a talk signal on that line.

The high on the output of the OR gate 319 produces a low on the output of a Schmitt trigger inverter 332 which results in discharging of a capacitance 333 through a diode 334. When the depressed talk pushbutton is released, the output of the inverter 332 again goes high blocking current flow through the diode 334 to permit the capacitance 333 to charge through the variable resistance 335 from the +5 volt source. After a time-out period, for example, three minutes, determined by the values of the capacitance 333 and adjustable resistance 335, serial Schmitt trigger converters 336 and 337 operate to apply a high to one input of an OR gate 338 which produces a high on line TEC to reset the latch 320. The output W4 of inverter 315 corresponding to depression of an end call pushbutton also is applied through OR gate 338 to reset the latch 320.

When the output of the OR gate 319 goes low, the second input of the AND gate 323 also goes low producing a low output which is inverted by inverter 339 and applied to the second input of AND gate 324 to operate analog switch 328 and apply a +5 volt signal on T/L line 26 to produce a listen signal. At the end of the time-out period, both gates 323 and 324 are disabled by the output of the latch 320 going low to produce a low from gate 321 controlling the gates 323 and 324.

Operation of a door talk pushbutton 502, 802 or 902 or a phone talk pushbutton 503, 803 or 903 produces a high on OR gates 318 and 319 setting the latch 320 as well as discharging the capacitance 333 to enable the beginning of a new time-out period upon release of the corresponding pushbutton switch. However, the output W2+W3 of the OR gate 318 is applied to the reset input of latch 322 to produce a 0 output disabling AND gate 321 which in turn disables AND gates 323 and 324 to prevent operation of the analog gates 327 and 328. The output of the latch 322 is connected to an analog switch 342 which, when the output of the latch 322 is high, applies a −5 volts to the input of an analog switch 343 to maintain a non-conductive state of the switch 343 between a −5 volt source and the T/L line 26. When the latch 322 is reset and its output goes low by operation of the door talk or phone talk pushbutton, the analog switch 342 is rendered non-conductive to apply a +5 volt through resistance 344 to the input of the analog switch 343 to render the switch 343 conductive and apply a −5 volt level, or talk condition, to the T/L line 26 until the line TEC goes high at the end of a time-out period to set the latch 322. Thus, the T/L line 26 is maintained at a −5 volt or talk condition during depression as well as during the timing period after release of the door talk or phone talk pushbutton.

The three voltage levels on the T/L line 36 determine the operating state of all stations, except the calling station. The 0 or normal state of the T/L line operates all of the stations to broadcast program signals, e.g., music, that is on the audio line 28. The −5 volt or talk signal on the line 26 operates all of the stations to broadcast intercom, door or phone voice signals from the audio line 28. The listen or +5 volt signal on the line 26 operates the non-calling stations to connect microphone circuits to the audio line to permit the stations to send signals on the audio line 28. Each of the stations contain a speaker circuit which in the non-calling stations is connected to the audio line during the 0 and −5 volt signals on T/L line 26, and contain a microphone circuit which is connected to the audio line when the listen or +5 volt signal is present on the T/L line 26.

The speaker circuit in the master station, as shown in FIG. 4, includes an intercom volume potentiometer 412 connected in parallel with a program volume potentiometer 413, these potentiometers connected in series with a resistance 414 across the audio line 28 and ground. An analog switch 415 controlled by a control line C2 connects the slider of the potentiometer 412 to the audio amplifier line 206 which is biased to ground by resistance 416; similarly, an analog switch 417 controlled by a control line C3 connects the slider of the program volume potentiometer 413 to the line 206. As shown in FIG. 3, an analog switch 346 operated by a control line C1 is connected in shunt from the line 206 to ground. A capacitance 347 couples the line 206 to the input of an audio amplifier 348 which includes conventional resistance and capacitance circuitry for filtering and frequency equalization. The output of the amplifier 348 is connected by a capacitance 349 to the internal speaker 242 of the master station as well as to the line 244 which can be connected to an external speaker such as speaker 702.

The microphone circuit for the master unit includes an electret microphone 419 which is biased by a voltage divider formed by resistances 420 and 421 connected serially between the 12 volt voltage source and ground with the junction thereof connected to the microphone. A capacitance 422 couples the microphone 419 to a first amplifier 423 which in turn is coupled by a capacitance 424 to a second amplifier 425. The output of the amplifier 425 is coupled through a three-position mode switch 426 and a capacitance 427 to an analog switch 428 which is controlled by the control line C1 and which is coupled in series with a resistance 429 to the audio line 28. The amplifiers 423 and 425 include conventional resistances, capacitances and diodes in their circuitry for filtration and frequency adjustment purposes as well as producing suitable gain, e.g., a gain of 5 for the amplifier 423 and a gain of 5 for the amplifier 425 to give an overall gain of 25, necessary to produce suitable signal level on the audio line 28. An analog switch 430 operated by a control line C4 is connected across the input of the amplifier 425 for shunting the amplifier input when the speaker of the station is being operated.

In order to operate the speaker or microphone circuit, the T/L line 26 is connected by respective resistances 432 and 433 to inputs of respective inverters 434 and 435 wherein the input of the inverter 434 is biased positive by a resistance 436 to a +5 volt source and the input of the inverter 435 is biased negative by a resistance 437 to the −5 volt source. The output of the inverter 434 is coupled by an inverter 438 to a line, inverted RT, which goes from high to low when the T/L line goes from 0 to −5 volts. The output of the inverter 435 is coupled by an inverter 439 to a line LSN which goes from low to high when the T/L line goes to +5 volts. The inverted RT line and LSN line are connected to first inputs of respective AND gates 440 and 441 which have their second inputs normally enabled by a high output from a NOR gate 442 which is interconnected with a NOR gate 443 in a flip-flop circuit arrangement. The outputs of the gates 440 and 441 are connected to inputs of respective NOR gates 444 and 445 whose outputs are connected to the respective control lines C2 and C4. The control C1 is produced by the output of a NOR gate 452 which has both inputs driven by the control C4, and is connected to a second input of the NOR gate 444. The C3 control is produced by AND gate 453 which has one input from the control line C4 and a second input from the output of a NOR gate 454 which has both inputs connected to the line C2.

When the T/L line 26 is 0, the high output of gate 440 and the low output of gate 441 result in a low C2, high C4, low C1, and high C3. The high C3 operates analog switch 417 to pass audio signal from line 28 through program volume potentiometer 413 to the speaker circuit via the line 206; the analog switches 428, 346 and 415 being maintained in open conditions by the low C1 and C2, and the analog switch 430 being energized to a closed condition by the high C4 to disconnect and disable the microphone circuit and the intercom volume control.

When the T/L line has a talk or −5 volt signal thereon, the output of AND gate 440 goes low to change C2 control to high closing the analog switch 415 to pass audio signals from the intercom volume potentiometer 412, and the line C3 goes low which results in an open condition of analog switch 417 to block the audio signals from the slider of program volume potentiometer 413. The provision of separate intercom volume and program volume controls enables each station to separately determine the volume of the intercom and program broadcast.

When the T/L line 26 goes high to +5 volts, the outputs of AND gates 440 and 441 both go high which produces a low C2, a low C4, a low C3 and a high C1 to close analog switches 428 and 346 and to open analog gates 415, 417 and 430 to thus disconnect and disable the speaker circuit and to connect and enable the microphone circuit to the audio line 28; thus the audio on microphone 419 generates audio signals on the common audio line 28.

When the master station is a calling station, the control of the microphone and speaker circuits are different compared to when the master station is not a calling station. As illustrated in FIG. 5, diodes 558, 559 and 560 connect the respective talk switches 501, 502 and 503 to a resistance 561 connected to the line 240. As shown in FIG. 4, the line 240 is biased positive by a resistance 462 so that when one of the talk switches 501, 502, and 503 is depressed, the line 240 is driven from a high to a low. An inverter 463 couples the line 240 to an input of NOR gate 442 for operating the flip-flop formed by NOR gates 442 and 443 to disable the AND gates 441 and 440 thus preventing the signals on T/L line 26 from controlling the operation of the microphone and speaker circuits. The output of the inverter 463 is also applied to one input of a NOR gate 464 which has its output coupled by inverter 465 to the second input of the NOR gate 445. When the line 240 thus goes low indicating the depression of one of the talk pushbuttons, lines C4 and C3 go low opening the analog switches 417 and 430 and line C1 goes high closing the analog switches 428 and 346 to disable the speaker circuit and enable the microphone circuit to permit the calling station to utilize the microphone 419 to transmit audio signals on audio line 28. After operation of the I/P talk pushbutton 501, the release of this button causes line 240 to return high which results in C4 and C2 going high to close analog switches 415 and 430 and C1 going low to open analog switches 428 and 346 to connect and enable the speaker circuit and to disconnect and disable the microphone circuit at the calling station; thus, audio signals on line 28 are applied to the calling station speaker. At the end of the time-out period after a I/P pushbutton release, the line 26 goes from +5 to 0 volts which results in the LSN control line going from high to low. The LSN line is connected to one input of a NOR gate 466 which has its other input connected to the output of the inverter 463 so that the output of gate 466 goes from low to high after release of a talk pushbutton and the line LSN goes low. The output of the gate 466 going high is applied through a short delay circuit formed by resistance 467 and capacitance 468 to the input of the NOR gate 443 to reset the flip-flop formed by gates 442 and 443. After an I/P talk, the signal LSN goes low only after the time-out period.

When the door talk pushbutton 502 or the phone talk pushbutton 503 is released, the line LSN does not go high but remains low. Thus, the release of the door talk or phone talk pushbutton results in the NOR gate 466 going high to reset the flip-flop formed by gates 442 and 443. Thus, the AND gates 440 and 441 are enabled to be controlled by the talk or −5 volt signal on T/L line 26 which results in disabling of the microphone circuit and enablement of the speaker circuit.

Figure 8:
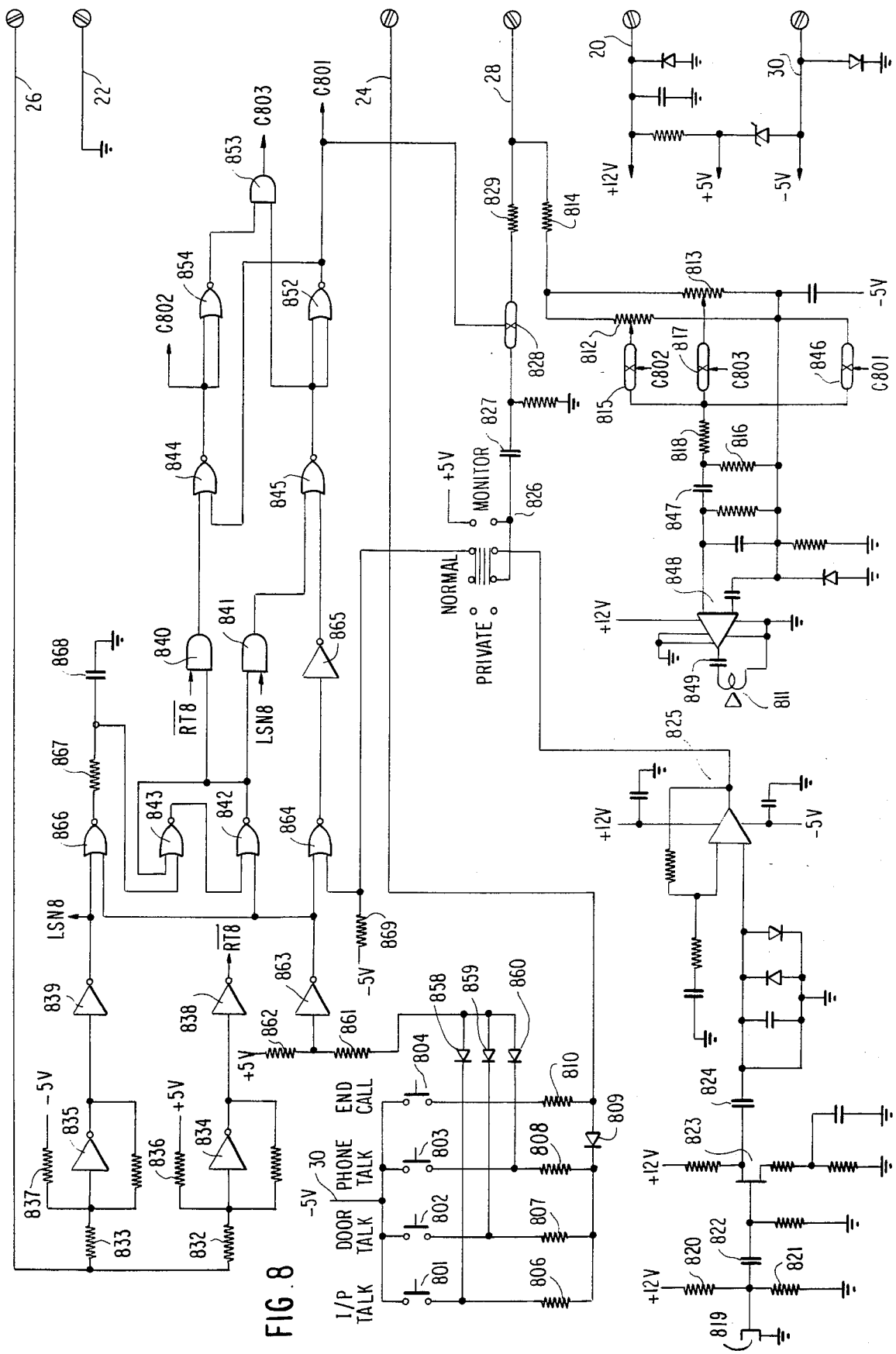
FIG. 8 is a detailed schematic view of the circuitry of inside remote units in the system of FIG. 1.

The speaker circuit in each inside remote station, as shown in FIG. 8 includes an intercom volume potentiometer 812 connected in parallel with a program volume potentiometer 813, these potentiometers connected in series with a resistance 814 across the audio line 28 and ground. An analog switch 815 controlled by a control line C802 connects the slider of the potentiometer 812 to one end of a resistance 818 which has its other end connected to a resistance 816 to a common line; similarly, an analog switch 817 controlled by a control line C803 connects the slider of the program volume potentiometer 813 to the resistances 818. An analog switch 846 operated by a control line C801 is connected in shunt across the resistances 816 and 818. A capacitance 847 couples the junction between resistances 816 and 818 to the input of an audio amplifier 848 which includes conventional resistance and capacitance circuitry for filtering and frequency equalization. The output of the amplifier 848 is connected by a capacitance 849 to the speaker 811 of the remote inside station.

The microphone circuit for each inside remote unit includes an electric microphone 819 which is biased by a voltage divider formed by resistances 820 and 821 connected serially between the +12 volt voltage source and ground with the junction thereof connected to the microphone. A capacitance 822 couples the microphone 819 to a first amplifier 823 which in turn is coupled by a capacitance 824 to a second amplifier 825. The output of the amplifier 825 is coupled through a three-position mode switch 826 and a capacitance 827 to an analog switch 828 which is controlled by the control line C801 and which is coupled in series with a resistance 829 to the audio line 28. The amplifier 823 and 825 include conventional resistances, capacitances and diodes in their circuitry for filtration and frequency adjustment purposes as well as producing suitable gain, e.g., a gain of 5 for the amplifier 823 and a gain of 5 for the amplifier 825 to give an overall gain of 25, necessary to produce suitable signal level on the audio line 28.

In order to operate the speaker or microphone circuit of the inside remote station, the T/L line 26 is connected by respective resistances 832 and 833 to inputs of respective inverters 834 and 835 wherein the input of the inverter 834 is biased positive by a resistance 836 to a +5 volt source and the input of the inverter 835 is biased negative by a resistance 837 to the −5 volt source. The output of the inverter 834 is coupled by an inverter 838 to a line, inverted RT8, which goes from high to low when the T/L line goes from 0 to −5 volts. The output of the inverter 835 is coupled by an inverter 839 to a line LSN8 which goes from low to high when the T/L line goes to +5 volts. The inverted RT8 line and LSN8 line are connected to first inputs of respective AND gates 840 and 841 which have their second inputs normally enabled by a high output from a NOR gate 842 which is interconnected with a NOR gate 843 in a flip-flop circuit arrangement. The outputs of the gates 840 and 841 are connected to inputs of respective NOR gates 844 and 845. The output of gate 844 is connected to the control line C802. The control C801 is produced by the output of a NOR gate 852 which has both inputs driven by the output of NOR gate 845, and is connected to a second input of the NOR gate 844. The C803 control is produced by AND gate 853 which has one input from the output of NOR gate 845 and a second input from the output of a NOR gate 854 which has both inputs connected to the line C802.

When the T/L line 26 is 0, the high output of gate 840 and the low output of gate 841 result in a low C802, low C801, and high C803. The high C803 operates analog switch 817 to pass audio signal from line 28 through program volume potentiometer 813 to the speaker 811 via resistance 818, capacitance 847 and amplifier 848; the analog switches 828, 846 and 815 being maintained in open conditions by the low C801 and C802 to disconnect the microphone circuit and the intercom colume control.

When the T/L line has a talk or −5 volt signal thereon, the output of AND gate 840 goes low to change C802 control to high closing the analog switch 815 to pass audio signals from the intercom volume potentiometer 812, and the line C803 goes low which results in an open condition of analog switch 817 to block the audio signals from the slider of program volume potentiometer 813. The provision of separate intercom volume and program volume controls enables each station to separately determine the volume of the intercom and program broadcast.

When the T/L line 26 goes high to +5 volts, the outputs of AND gates 840 and 841 both go high which produces a low C802, a low C803 and a high C801 to close analog switches 828 and 846 and to open analog gates 815 and 817 to thus disconnect and disable the speaker circuit and to connect the microphone circuit to the audio line 28; thus the audio on microphone 819 generates audio signals on the common audio line 28.

For changing operation of the inside remote unit when used as a calling station, diodes 858, 859 and 860 connect the respective talk switches 801, 802 and 803 to a resistance 861 connected to an input of an inverter 863. The input of inverter 863 is biased positive by a resistance 862 so that when one of the talk switches 801, 802 and 803 is depressed, the output of inverter 863 applies a high to an input of NOR gate 842 for operating the flip-flop formed by NOR gates 842 and 843 to disable the AND gates 841 and 840, thus preventing the signals on T/L line 26 from controlling the operation of the microphone and speaker circuits. The output of the inverter 863 is also applied to one input of a NOR gate 864 which has its output coupled by inverter 865 to the second input of the NOR gate 845. When the output of inverter 863 goes high indicating the depression of one of the talk pushbuttons, line C803 goes low opening the analog switch 817 and line C801 goes high closing the analog switches 846 and 828 to disable the speaker circuit and enable the microphone circuit to permit the calling station to utilize the microphone 819 to transmit audio signals on audio line 28. After operation of the I/P talk pushbutton 801, the release of this button causes the output of inverter 863 to return low which results in C802 going high to close analog switch 815 and C801 going low to open analog switches 828 and 846 to connect and enable the speaker circuit and to disconnect the microphone circuit at the calling station; thus, audio signals on line 28 are applied to the calling station speaker. At the end of the time-out period after an I/P pushbutton release, the line 26 goes from +5 to 0 volts which results in the LSN8 control line going from high to low. The LSN8 line is connected to one input of a NOR gate 866 which has its other input connected to the output of the inverter 863 so that the output of gate 866 goes from low to high after release of a talk pushbutton and the line LSN8 goes low. The output of the gate 866 going high is applied through a short delay circuit formed by resistance 867 and capacitance 868 to the input of the NOR gate 843 to reset the flip-flop formed by gates 842 and 843. After an I/P talk, the signal LSN8 goes low only after the time-out period.

When the door talk pushbutton 802 or the phone talk pushbutton 803 is released, the line LSN8 does not go high but remains low. Thus, the release of the door talk or phone talk pushbutton results in the NOR gate 866 going high to reset the flip-flop formed by gates 842 and 843. Thus, the AND gates 840 and 841 are enabled to be controlled by the talk or −5 volt signal on T/L line 26 which results in disabling of the microphone circuit and enablement of the speaker circuit.

Figure 9:
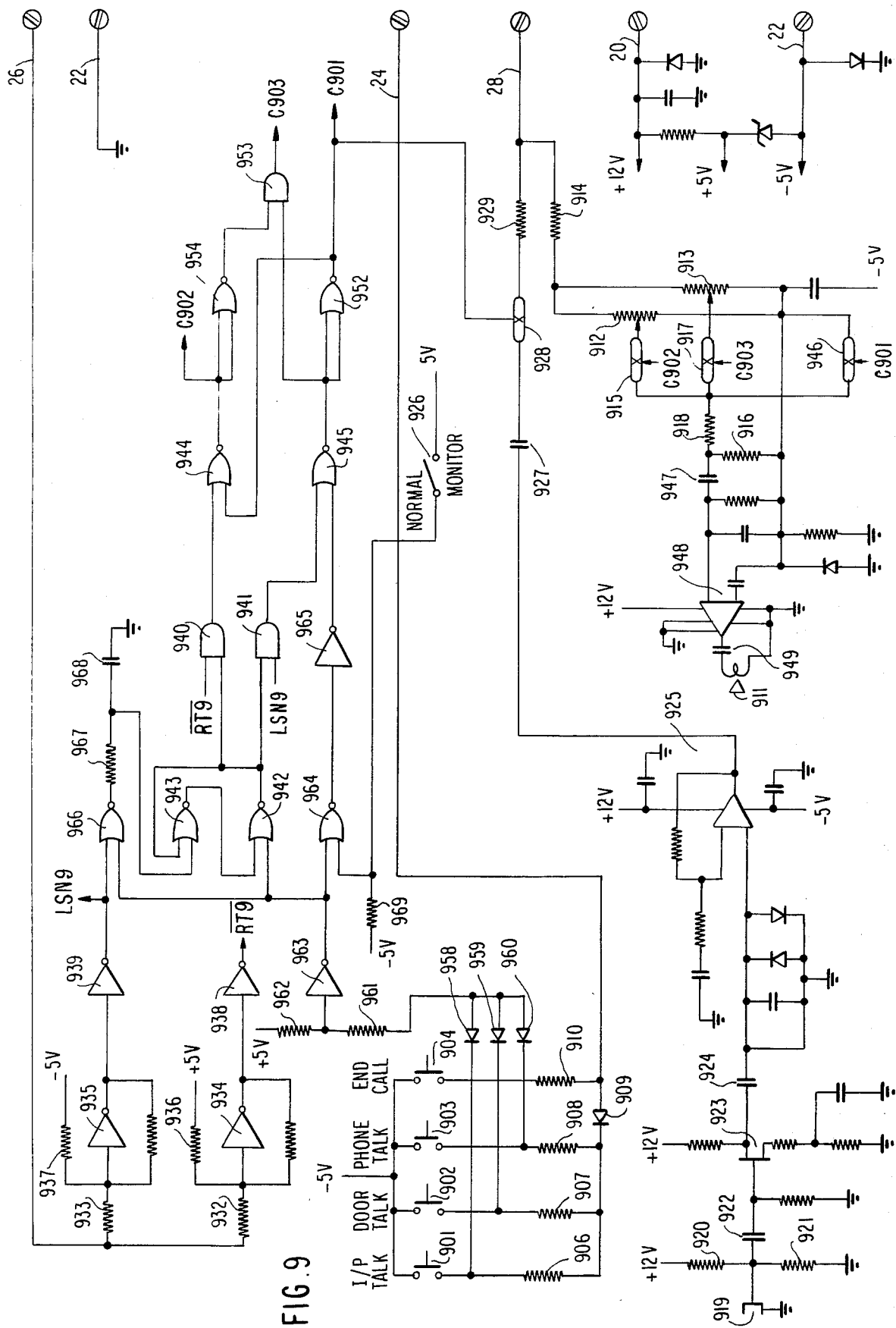
FIG. 9 is a detailed schematic of the circuitry of outside remote units in the system of FIG. 1.

The speaker circuit in each outside remote station, as shown in FIG. 9, includes an intercom volume potentiometer 912 connected in parallel with a program volume potentiometer 913, these potentiometers connected in series with a resistance 914 across the audio line 28 and ground. An analog switch 915 controlled by a control line C902 connects the slider of the potentiometer 912 to one end of a resistance 918 which has its other end connected to a resistance 916 to a common line; similarly, an analog switch 917 controlled by a control line C903 connects the slider of the program volume potentiometer 913 to the resistance 918. An analog switch 946 operated by a control line C901 is connected in shunt across the resistances 916 and 918. A capacitance 947 couples the junction between resistances 916 and 918 to the input of an audio amplifier 948 which includes conventional resistance and capacitance circuitry for filtering and frequency equalization. The output of the amplifier 948 is connected by a capacitance 949 to the speaker 911 of the outside remote station.

The microphone circuit for each outside remote station includes an electret microphone 919 which is biased by a voltage divider formed by resistances 920 and 921 connected serially between the +12 volt voltage source and ground with the junction thereof connected to the microphone. A capacitance 922 couples the microphone 919 to a first amplifier 923 which in turn is coupled by a capacitance 924 to a second amplifier 925. The output of the amplifier 925 is coupled through a capacitance 927 to an analog switch 928 which is controlled by the control line C901 and which is coupled in series with a resistance 929 to the audio line 28. The amplifiers 923 and 925 include conventional resistances, capacitances and diodes in their circuitry for filtration and frequency adjustment purposes as well as producing suitable gain, e.g., a gain of 5 for the amplifier 923 and a gain of 5 for the amplifier 925 to give an overall gain of 25, necessary to produce suitable signal level on the audio line 28.

In order to operate the speaker or microphone circuit of the outside remote station, the T/L line 26 is connected by respective resistances 932 and 933 to inputs of respective inverters 934 and 935 wherein the input of the inverter 934 is biased positive by a resistance 936 to a +5 volt source and the input of the inverter 435 is biased negative by a resistance 937 to the −5 volt source. The output of the inverter 934 is coupled by an inverter 938 to a line, inverted RT9, which goes from high to low when the T/L line goes from 0 to −5 volts. The output of the inverter 935 is coupled by an inverter 939 to a line LSN9 which goes from low to high when the T/L line goes to +5 volts. The inverted RT9 line and LSN9 line are connected to first inputs of respective AND gates 940 and 941 which have their second inputs normally enabled by a high output from a NOR gate 942 which is interconnected with a NOR gate 943 in a flip-flop circuit arrangement. The outputs of the gates 940 and 941 are connected to inputs of respective NOR gates 944 and 945. The output of gate 944 is connected to the control line C902. The control C901 is produced by the output of a NOR gate 952 which has both inputs driven by the output of NOR gate 945, and is connected to a second input of the NOR gate 944. The C903 control is produced by AND gate 953 which has one input from the output of NOR gate 945 and a second input from the output of a NOR gate 954 which has both inputs connected to the line C902.

When the T/L line 26 is 0, the high output of gate 940 and the low output of gate 941 result in a low C902, low C901, and high C903. The high C903 operates analog switch 917 to pass audio signal from line 28 through program volume potentiometer 913 to the speaker 911; via resistance 918, capacitance 947 and amplifier 948; the analog switches 928, 946 and 915 being maintained in open conditions by the low C901 and C902 to disconnect the microphone circuit and the intercom columé control.

When the T/L line has a talk or −5 volt signal thereon, the output of AND gate 940 goes low to change C902 control to high closing the analog switch 915 to pass audio signals from the intercom volume potentiometer 912, and the line C903 goes low which results in an open condition of analog switch 917 to block the audio signals from the slider of program volume potentiometer 913. The provision of separate intercom volume and program volume controls enables each station to separately determine the volume of the intercom and program broadcast.

When the T/L line 26 goes high to +5 volts, the outputs of AND gates 940 and 941 both go high which produces a low C902, a low C903 and a high C901 to close analog switches 928 and 946 and to open analog gates 915 and 917 to thus disconnect and disable the speaker circuit and to connect the microphone circuit to the audio line 28; thus the audio on microphone 919 generates audio signals on the common audio line 28.

For changing operation of the outside remote unit when used as a calling station, diodes 958, 959 and 960 connect the respective talk switches 901, 902 and 903 to a resistance 961 connected to an input of an inverter 963. The input of the inverter 963 is biased positive by a resistance 962 so that when one of the talk switches 901, 902, and 903 is depressed, the output of inverter 963 goes from low to high to apply a high to an input of NOR gate 942 for operating the flip-flop formed by NOR gates 942 and 943 to disable the AND gates 941 and 940 thus preventing the signals on T/L line 26 from controlling the operation of the microphone and speaker circuits. The output of the inverter 963 is also applied to one input of a NOR gate 964 which has its output coupled by inverter 965 to the second input of the NOR gate 945. When the output of gate 963 goes high indicating the depression of one of the talk pushbuttons, line C903 goes low opening the analog switch 917 and line C901 goes high closing the analog switches 928 to disable the speaker circuit and enable the microphone circuit to permit the calling station to utilize the microphone 919 to transmit audio signals on audio line 28. After operation of the I/P talk pushbutton 901, the release of this button causes the input of inverter 963 to return low which results in C902 going high to close analog switch 915 and C901 going low to open analog switches 928 and 946 to connect and enable the speaker circuit and to disconnect the microphone circuit at the calling station; thus, audio signals on line 28 are applied to the calling station speaker. At the end of the time-out period after an I/P pushbutton release, the line 26 goes from +5 to 0 volts which results in the LSN9 control line going from high to low. The LSN9 line is connected to one input of a NOR gate 966 which has its other input connected to the output of the inverter 963 so that the output of gate 966 goes from low to high after release of a talk pushbutton and the line LSN9 goes low. The output of the gate 966 going high is applied through a short delay circuit formed by resistance 967 and capacitance 968 to the input of the NOR gate 943 to reset the flip-flop formed by gates 942 and 943. After an I/P talk, the signal LSN9 goes low only after the time-out period.

When the door talk pushbutton 902 or the phone talk pushbutton 903 is released, the line LSN9 does not go high but remains low. Thus, the release of the door talk or phone talk pushbutton results in the NOR gate 966 going high to reset the flip-flop formed by gates 942 and 943. Thus, the AND gates 940 and 941 are enabled to be controlled by the talk or −5 volt signal on T/L line 26 which results in disabling of the microphone circuit and enablement of the speaker circuit.

The master station includes a three position switch 426 and the inside remote station contains a three position switch 826. The switches 426 and 826 have private, normal and monitor positions. The above description of the operation of the stations assumes that the switches 426 and 826 are in the normal position. When the switch 426 is moved to the private position, the output line of microphone amplifier 425 is opened so that audio or voice signals picked up by the microphone 419 are not applied to the common audio line 28 even when the microphone circuitry is enabled by a listen signal on line 26 or by line 240 being low. This prevents the intercom system from being utilized to eavesdrop on conversation in a room containing the master station by momentarily depressing an I/P talk pushbutton. Similarly, the inside remote stations with switches 826 in the private position prevent overhearing of private conversation at such remote stations. In the monitor position, the switch 426 applies a +5 voltage to a second input of NOR gate 464, this second input being normally biased low by resistance 469. The output of gate 464 is thus held low which results in C4, C2 and C3 being held low and C1 held high to disable the speaker circuitry and enable the microphone circuitry; thus, audio picked up by microphone 419 will be transmitted on the common audio line 28 to the other stations. The three position switch 826 of the inside remote stations operates the inside remote stations in a manner identical to the master station operation by switch 426. The outside remote stations have only a two-position switch 926 which has only normal and monitor positions operating in substantially the same manner as the normal and monitor positions of the three-position switches of FIGS. 4 and 8. Thus the outside remote stations cannot be switched to prevent overhearing of conversation by someone momentarily depressing a I/P talk pushbutton switch 501, 801, or 901.

As shown in FIG. 3, the line W2 which goes high when a door talk pushbutton switch 502, 802 or 902 is depressed, is connected by a resistance 351 to the gate of an analog switch 352 which is connected in series with the coil of a relay 353 which has normally open contacts connected between the output of a door and phone amplifier 354 and the line 52 to the door speaker. The W2+W3 line operates an analog gate 355 connecting the input of the amplifier 354 to the output of a summing amplifier 356 which has its input connected to a summing resistance 357 connected to the common audio line 28. Audio signals on the audio line 28, generated by the microphone circuit of the station when the door talk pushbutton switch is depressed, are suitably amplified and passed by line 52 to the door speaker or speakers 144 and 148.

The line W2 is also connected to the set input of a door latch 359. The output of the door latch 359 is connected to one input of an AND gate 360 which has its other input connected to the inverse W2+W3 line so that the output of the gate 360 remains low until the door talk push button switch is released. While W2 is high, a capacitance 361 is charged by current through resistance 362 and diode 363. Now when W2 goes low and the output of AND gate 360 goes high, the charge on the capacitance 361 through resistance 364 momentarily holds the inputs of OR gate 365 low to prevent the high from AND gate 360 through resistance 366 to the inputs of OR gate 365 from operating the OR gate. When the charge is reversed by current through the resistance 364, capacitance 361 and a diode 367, the OR gate 365 operates an analog switch 368. The door speaker or speakers 144 and 148 are of the type that can operate either as a speaker or as a microphone. The switch 368 connects the door speaker line 52 to the input of an amplifier 370. An analog switch 371 operated by the inverse W2+W3 line connects a volume control potentiometer on the output of the amplifier 370 to the input of an amplifier 372 which has its output coupled to the summing resistance 357. Thus, during the timing period, i.e., until the latch 359 is reset by the TEC line, audio signals generated by the door speakers operating as microphones are applied from line 52 through switch 368, amplifier 370, switch 371 and amplifier 372 to the audio line 28 which carries the signals for broadcast from all of the intercom stations.

The delay circuit formed by the capacitance 361, resistances 362 and 364 and the diodes 363 and 367 is particularly advantageous in preventing the door speaker line 52 from being simultaneously connected to the output amplifier 354 and the input of amplifier 370. The charge built up on the capacitance 361 when W2 is high prevents switch 368 from being operated until the charge is reduced by current flow through resistance 364 and diode 367, and the charge built up on the capacitance 361 when the output of gate 360 is high prevents the switch 352 from being operated when W2 goes high by a subsequent depression of the door talk pushbutton switch during the time-out period. This prevents substantial feedback through the system which could cause loud unwanted signals on the station speakers.

The phone talk control line W3, which goes high when a phone talk switch 503, 803 or 903 is depressed, is connected to the set input of a phone latch 374, which produces a high on off-hook line 44 when the latch is set. Also the line W3 is connected to an AND gate 375 which has its other input biased high by squelch circuit indicated generally at 376. The output of the AND gate 375 is connected to the control input of an analog switch 377 to complete a circuit from system audio line 28 and summing resistance 357 through amplifier 356, analog switch 355, amplifier 354, line A, and switch 377 through a volume control potentiometer and output coupling capacitance to line 50 providing audio input to the telephone coupler circuit of FIG. 10. Upon release of the phone talk pushbutton switch, the inverse W2+W4 line goes high which operates AND gate 378 which in turn operates AND gate 379 to produce a high on line P1 operating analog switch 380. The analog switch 380 is connected in a circuit from phone audio output line 48, a coupling capacitance and a volume control potentiometer to the input of the amplifier 372 to thus connect the audio from the telephone coupler to the system audio line 28.

The ring detect signal line 46 is connected to one input of an AND gate 383 which has its other input connected to a free running square wave oscillator 384 operating at a low frequency. The output of the AND gate 383 operates a analog switch 385 in an oscillator circuit 386 which operates at a higher audio frequency. The oscillator 386 is turned on and off by the alternating output of the low frequency oscillator 384 to generate a broken tone ring signal which is applied through a coupling capacitance and volume control potentiometer to the input of amplifier 372 producing the ring signal on the system audio line 28.

The audio line also receives program audio signals from line 204 which are applied to the input of the amplifier 372. The output of the latch 320 is applied by an inverter 388 to the program mute line 208 for causing muting of the program audio during periods that one of the intercom talk pushbutton switches 501, 801 or 901, door talk pushbutton switches 502, 802 or 902 or phone talk pushbutton switches 503, 803 or 903 is depressed as well as the answerback time following release of the button until the latch 320 is reset by the expiration of the time delay or by an end of call signal W4.

Figure 10:
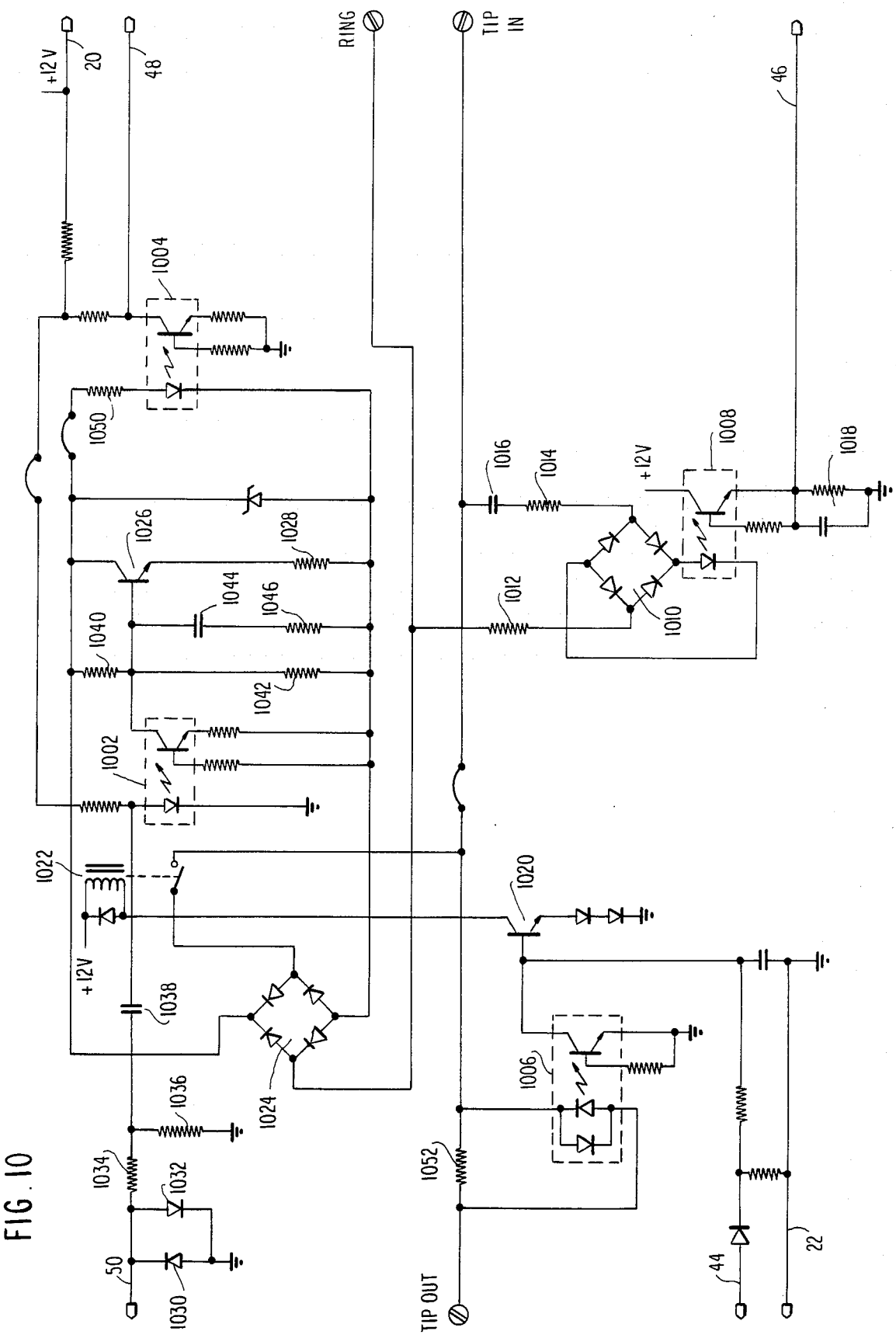
FIG. 10 is a detailed schematic view of a telephone coupler circuitry in the system of FIG. 1.

As shown in FIG. 10, the telephone coupler utilizes optical isolators 1002, 1004, 1006 and 1008 for coupling to the telephone lines RING and TIP. A full wave rectifier 1010 is connected across the RING and TIP lines by resistances 1012 and 1014 and a coupling capacitance 1016 for producing a rectified output which is connected across the LED of the optical isolator 1008. The phototransistor of the isolator 1008 has its emitter connected in series with a parallel resistance and capacitance circuit 1018 and to the ring detector line 46. The values of the resistances 1012 and 1014 and the capacitance 1016 are selected to suitably operate the optical isolator 1008 when a ringing signal occurs on the telephone lines.

The off hook control line 44 is connected to the base of a transistor 1020 which has its emitter collector connected in series with a coil of a relay 1022. Normally open contacts of the relay 1022 connect the telephone lines RING and TIP across inputs of a diode bridge 1024 which has its output coupled across a variable impedance network including a transistor 1026 in series with a resistance 1028. The audio-in line 50 has protective diodes 1030 and 1032 connected thereacross with a series resistance 1034 and resistance 1036 connected to ground for limiting the maximum audio signal to be applied across the light-emitting diode of optical oscillator 1002 by the coupling capacitance 1038. The phototransistor of the isolator 1002 is connected to the base of the transistor 1026 for modulating the impedance across the bridge 1024 in accordance with the audio signals generated at a intercom station having its phone talk pushbutton depressed. The base of the transistor 1026 is biased by a voltage divider consisting of resistances 1040 and 1042. A series capacitance 1044 and resistance 1046 are coupled to the base of the transistor 1026 for rendering the input circuitry to the telephone lines frequency responsive, i.e., the capacitance 1044 shunts a portion of the audio frequencies above about 100 hertz to effectively increase the impedance across the phone lines from about 200 ohms at DC into a impedance between 600 and 800 ohms at higher audio frequencies. Incoming audio signals on the telephone lines pass through the diode bridge 1024 and are applied by a resistance 1050 to the LED of the optical isolator 1004 which has its collector coupled to the audio-out line 48. Thus, when the phone talk pushbutton switch is released, incoming audio signals on the telephone lines are transmitted via line 48 to the intercom system to be broadcast on the station speakers.

The incoming telephone line TIP from the telephone company network is connected serially through the telephone coupler which includes a small resistance, such as a 100 ohm resistance 1052 connected serially between the TIP in and TIP out terminals. The LED of isolator 1006 is coupled across the resistance 1052 to operate the phototransistor of the isolator when the subscriber telephone is taken off hook to draw a current through the tip line. The output of the phototransistor of the isolator 1006 is connected across the base of the transistor 1020 so that operation of the isolator 1006 renders the transistor 1020 non-conductive to interrupt the current flow through the coil of the relay 1022 and thus disconnect the intercom system from the telephone lines by opening the contacts of the relay 1020. This insures that a private telephone conversation over the subscriber telephone is not broadcast throughout the intercom system.

When the intercom system is not being used for a talk function, program or music signals can be applied to the common audio line 28. This program signal can be selected from various sources such as the output of an AM radio, a FM radio, a phonograph, tape deck connected to to the system.

Figure 11:
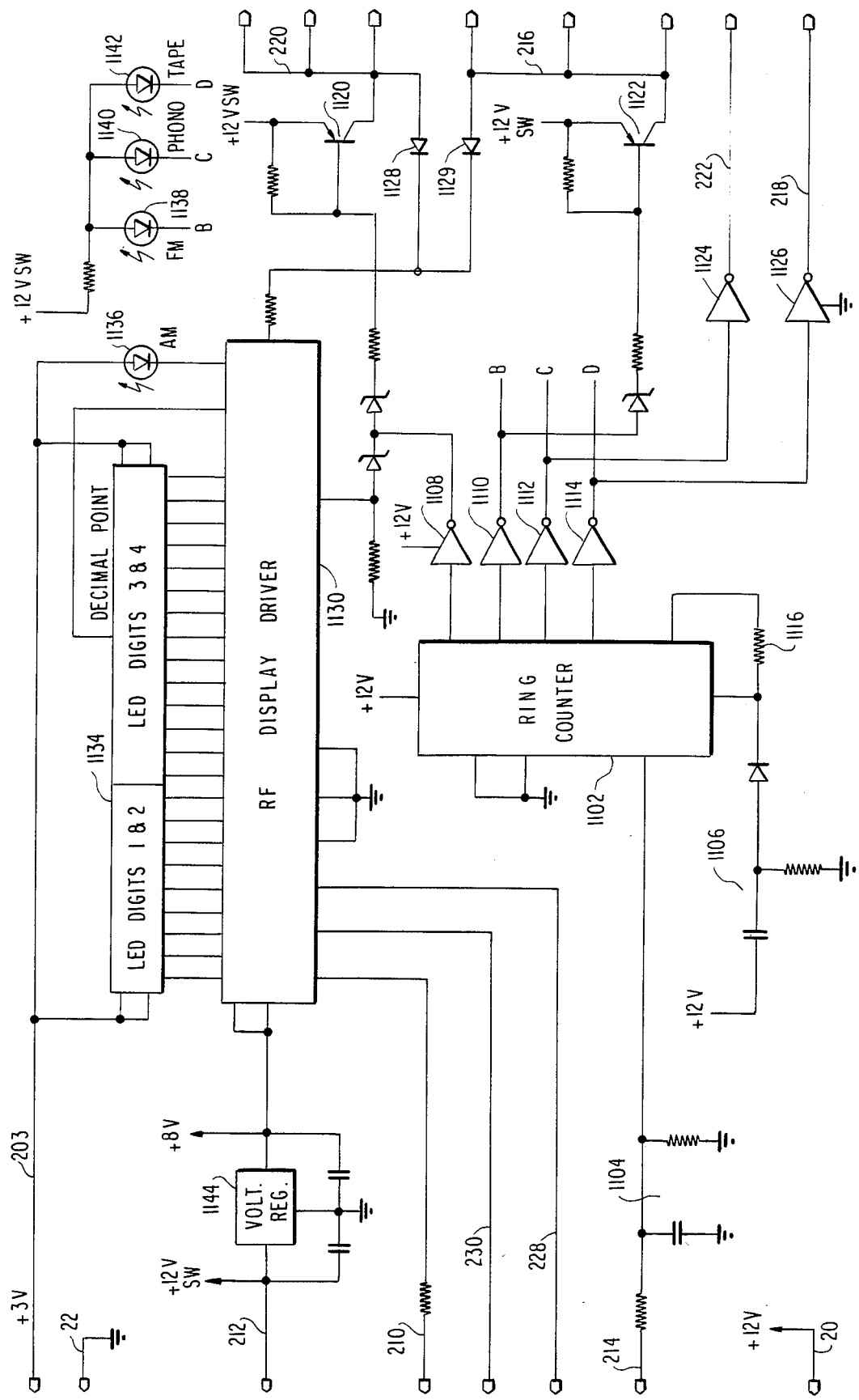
FIG. 11 is a schematic of the display circuitry contained within the master control unit of FIG. 2.

The program select line 214 from the select pushbutton switch 405 of FIG. 4, is connected to an input of a ring counter 1102 in FIG. 11 by a suitable filter and delay circuit 1104. A power up circuit 1106 is connected to a reset input of the ring counter 1104 so that upon initial application or reapplication after power interruption, the ring counter 1102 is reset to produce an output operating inverter 1108 corresponding to selection of AM radio. Pulses applied to select line 214 step the ring counter 1102 to successively operate inverter 1110 corresponding to FM radio selection, inverter 1112 corresponding to phono selection, and inverter 1114 corresponding to tape selection. A resistance 1116 connects the fifth stage of the ring counter 1102 to the reset input so that when the ring counter reaches the count of five it resets to the first count. The outputs of the inverters 1108, 1110, 1112 and 1114 are coupled, respectively, to a transistor switch 1120 operating the AM control line 220, a transistor switch 1122 operating the FM control line 216, an inverter 1124 operating the tape control line 222, and inverter 1126 operating the phono control line 218. The AM and FM control lines 220 and 216 are connected by respective isolating diodes 1128 and 1129 to a control input of a RF display driver 1130. The output of the inverter 1108 is connected to an AM/FM control input of the driver 1130. AM local oscillator signals on line 228 and FM local oscillator signals divided by 100 on line 230 are applied to corresponding inputs of the RF display driver. A 60 Hz clock signal is applied by line 210 to a clock input of the RF display driver. A LED digital display 1134 is connected to outputs of the driver 1130 for displaying the frequency of the corresponding selected AM or FM radio signal. An LED 1136 is connected to the display 1130 for indicating AM selection, a LED 1138 is connected to the output of the inverter 1110 for indicating FM selection, a LED 1140 is connected to the output of the inverter 1112 for indicating phono selection, and a LED 1142 is connected to the output of the inverter 1114 for indicating tape selection. Switch 12 volt voltage supply on line 212 from the on/off switch 404 of FIG. 4 is applied to the transistor switches 1120 and 1122, to the LEDs 1138, 1140 and 1142 and to voltage regulator 1144 supplying the driver 1130 to turn off the AM and FM radio circuits as well as the display.

Referring back to FIG. 4, the AM control line 220, FM control line 216, tape control line 222 and phone control line 218 are connected by respective level control zener diodes to first inputs of respective AND gates 472, 473, 474 and 475 which have their other inputs connected to the mute control line 208. The outputs of the respective AND gates 472, 473, 474 and 475 are connected to control inputs of respective analog switches 477, 478, 479 and 480 which control application of audio signals to the program audio line 204 from the respective AM audio line 236, FM audio line 238, phono jack 483 and tape jack 482 which may be connected to suitable sources such as a phonograph and a tape deck. The AM and FM audio lines are connected through respective level control potentiometers 484 and 485 to the analog switches 477 and 478. The common output of the analog switches 477, 478, 480, 499 are connected through a treble control circuit 488 to the program audio line 204.

Figure 12:
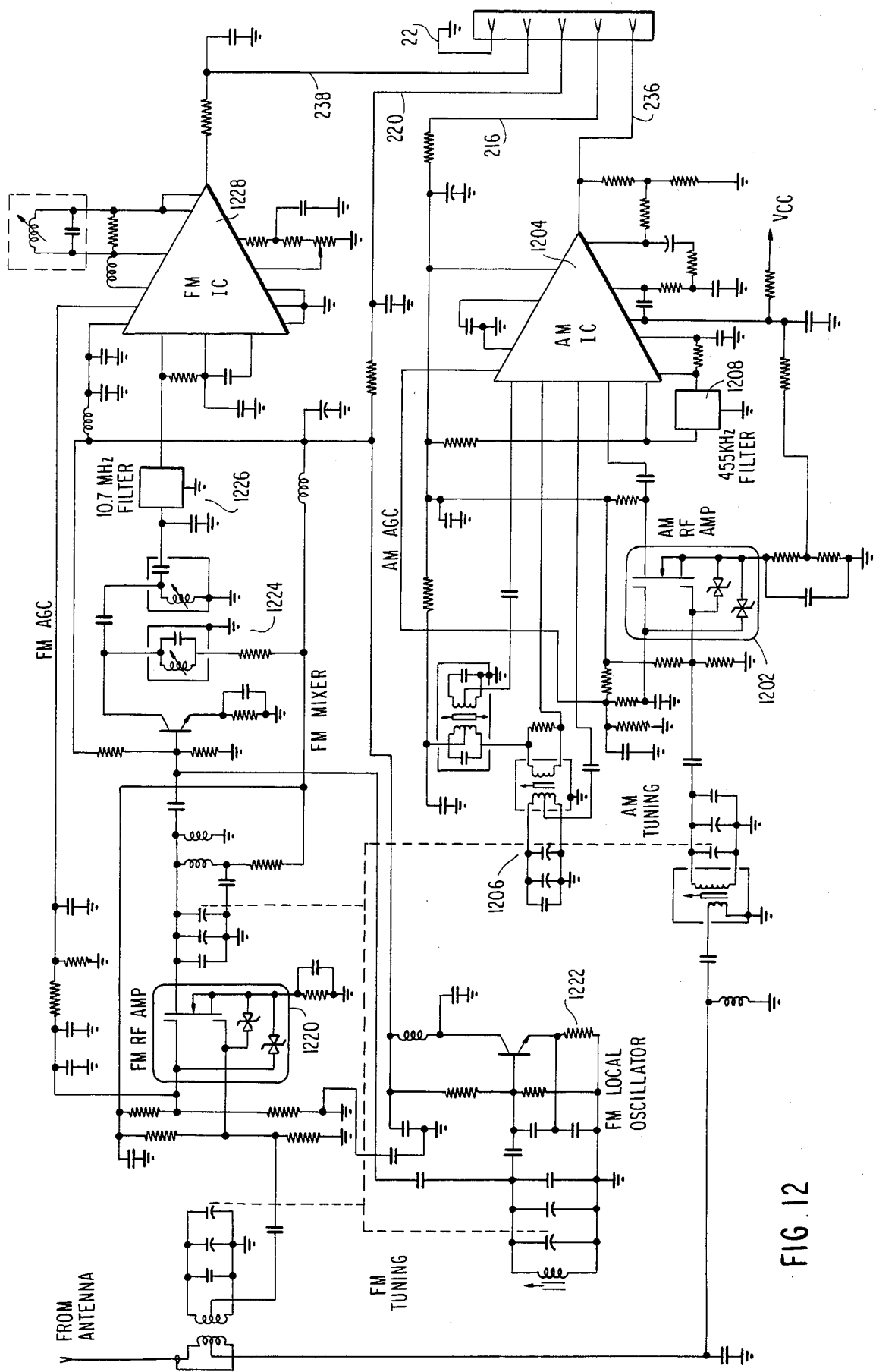
FIG. 12 is a detailed schematic of the tuner circuitry contained within the master control unit of FIG. 2.

The AM/FM tuner circuit, as shown in FIG. 12, includes conventional AM and FM circuitry which are energized by the respective AM control line 216 and FM control line 220. The AM circuit includes an AM RF amplifier 1202 with an AM circuit 1204 which includes a provision for a local AM oscillator 1206 and an intermediate frequency filter 1208. AM audio is produced on the output line 236. Similarly, the FM radio circuit includes a FM RF amplifier 1220, a FM local oscillator 1222, a FM mixer circuit 1224, an intermediate frequency filter 1226 and a FM circuit 1228 for generating a FM audio signal on line 238.

The circuitry in the prescaler module 1300 is shown in FIG. 13 and includes respective circuits controlled by the AM control line 220 and FM control line 216 for applying the AM local oscillator signal to line 228 and FM local oscillator signal divided by 100 to line 230. When the AM control line is high, the AM local oscillator signal is applied through a coupling capacitance 1302 and buffer amplifier 1304 through capacitance 604 to the line 228. The FM control signal is applied via a filter and voltage regulator circuit to wide band amplifier 1320 and prescaler 1322. Coil 1324 is a link coupling to the FM local oscillator 1222 of FIG. 12. The local oscillator frequency picked up by the loop 1324 is amplified by the amplifier 1320 to a level suitable for use by the prescaler 1322 which divides this frequency by 100 and produces it on the output 230 through a low pass filter 1326.

In the power supply circuit 1400 as shown in FIG. 14, 16-volt AC input from the transformer across lines 62 and 64 is applied to diode bridge 1402. Capacitor 1404 is coupled across the output of the diode bridge and is applied to voltage regulator 1406 which is set to produce 12-volt DC on line 20. Lines 58 and 60, connected to a second 16-volt AC output of the transformer, are connected by diodes 1420 across a filter capacitance 1422 and to a +5 volt voltage regulator 1424, and are connected by opposite polarity diodes 1430 across a capacitance 1432 and to a −5 volt regulator 1434. The outputs of the respective regulators 1424 and 1434 are connected to the respective +5 volt supply line 202 and the −5 volt supply line 30.

Lines 54 and 56 from a 6 volt AC output of the transformer are connected by diodes 1440 to the +3 volt line 203 for forming a full wave raw DC power supply of about 3 volt RMS to drive the display LED of FIG. 11.

Figure 15:
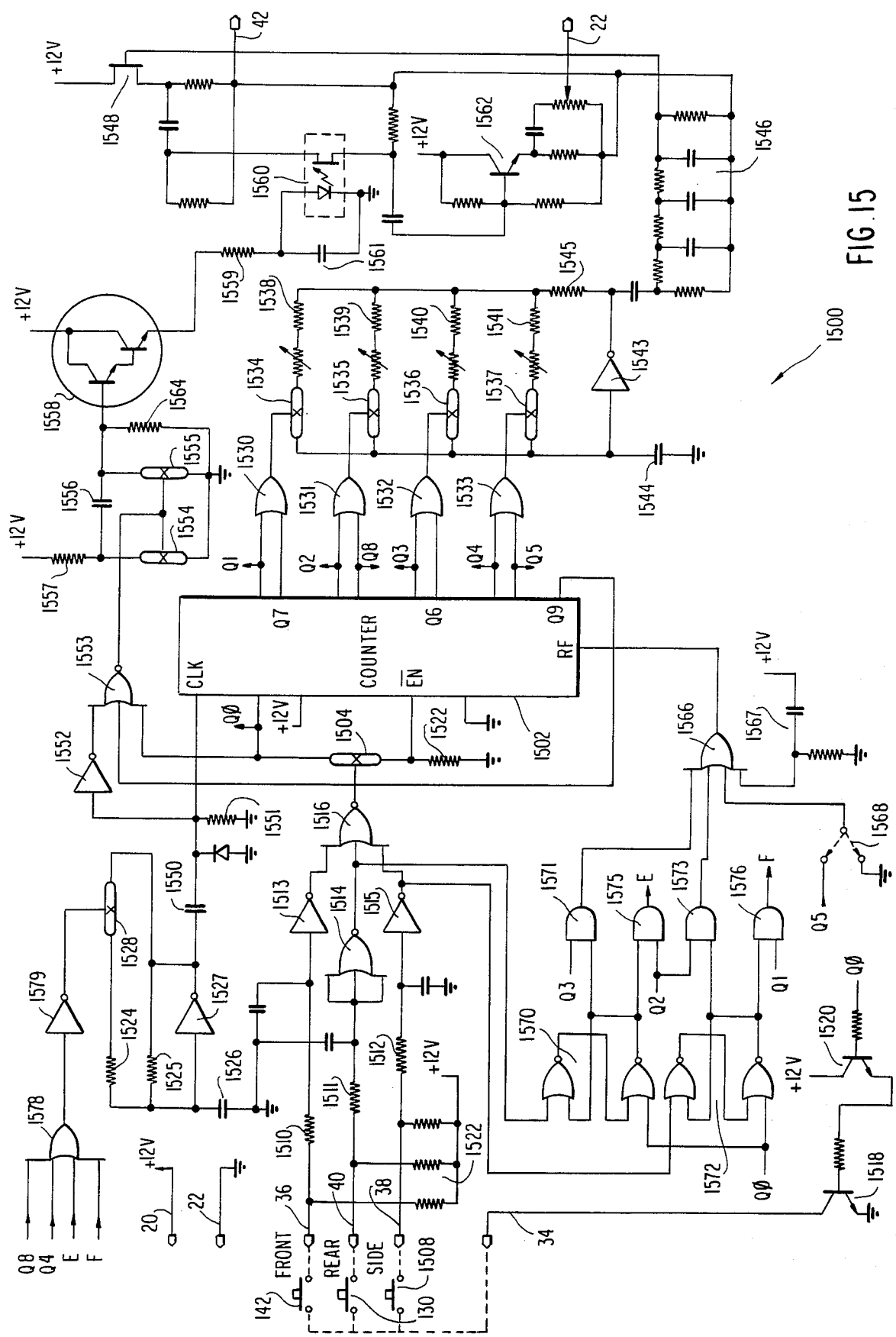
FIG. 15 is a detailed schematic of the chime circuitry contained within the master control unit of FIG. 2.

The electronic chime circuit of FIG. 15 includes a ring counter 1502 which, in its initial state, has a high an output Q0. Front door pushbutton switch 142, rear door pushbutton switch 130, and side door pushbutton switch 1508 are connected by respective resistances 1510, 1511 and 1512 to inputs of respective inverters 1513, 1514 and 1515 which have their outputs connected to respective inputs of a NOR gate 1516 which has its output controlling the switch gate 1504. The common sides of the switches 142, 130 and 1508, which can be lighted switches, are connected to line 34 which in turn is connected to the collector of a transistor 1518 controlled by the output of a transistor 1520 connected to the Q0 output of the counter 1502. When Q0 is high, the transistors 1520 and 1518 are conductive connecting the common pushbutton line 34 to ground. The opposite sides of the pushbutton switches 142, 130 and 1508 are biased by respective resistances 1522 to +12 volts. Thus, when one of the pushbuttons is depressed, the input of the corresponding inverter 1513, 1514 or 1515 is pulled low causing the output of NOR gate 1516 to go low and disconnect the Q0 output from the enable input of the counter 1502 and allow the resistance 1522 to pull the enable input low. Resistances 1524 and 1525, capacitance 1526, amplifier 1527 and analog switch 1528 form a free running Schmitt trigger oscillator or clock circuit. After enabling of the counter 1502, the next positive transition of the clock causes the counter to step so that Q1 goes high and Q0 goes low. The pushbutton may be released at this point since Q0 is low and will not disable the counter 1502.

The outputs Q1, Q2, Q3, Q4, Q5, Q6, Q7 and Q8 are connected to selected inputs of OR gates 1530, 1531, 1532 and 1533 which have their outputs controlling respective analog switches 1534, 1535, 1536 and 1537. These analog switches are connected in series with respective resistances 1538, 1539, 1540 and 1541 for selectively connecting one of these resistances in a Schmitt trigger tone oscillator formed by amplifier 1543, capacitance 1544 and a resistance 1545. The square wave output of this oscillator is filtered by a filter circuit 1546 and applied to the gate of a buffer transistor amplifier 1548.

The output of the amplifier 1527 is differentiated by capacitance 1550 and resistance 1551 to apply a pulse to Schmitt trigger inverter 1552 which produces a square negative going output pulse of about 40 milliseconds. This pulse operates NOR gate 1553 to turn on analog switches 1554 and 1555. The switches 1554 and 1555 are connected between the opposite sides of a capacitance 1556 and ground to discharge the capacitance during the pulse from gate 1553. At the termination of the pulse, the capacitance 1556 is pulled high by resistance 1557 connected to the +12 volt source to apply a high to the base of a Darlington transistor 1558. This renders the transistor pair 1558 conductive to pass current from a +12 volt source through a resistance 1559 to the LED of an optocoupler 1560 having a capacitance connected across its LED. The phototransistor of the optocoupler 1560 couples the source of the transistor amplifier 1548 to the base of a emitter follower transistor 1562 which drives the chime signal line 22 through a level control potentiometer. The phototransistor of the optocoupler 1560 acts as a variable resistance. When the Darlington pair 1558 is initially turned on, the capacitance 1561 charges to thus produce a rise time to render the phototransistor of optocoupler 1560 conductive. Capacitance 1556 is charged through resistance 1557 and a resistance 1564 to ground to thus reduce the voltage on the base of transistor pair 1558 and decay the voltage across the LED of optocoupler 1560. This produces an exponential decay of the magnitude of the signal passed to emitter follower 1562. Thus, the audio signal output has a controlled rise time as well as a controlled delay time for producing an envelope resulting in an audio signal from the chime circuit which closely resembles the sound produced by the striking of a chime.

As the oscillator 1527 continues to apply clock pulses to the counter 1502, the outputs Q1, Q2, Q3 go high to operate the corresponding switches 1534, 1535, 1536 and 1537. The resistances 1538, 1536, 1540 and 1541 are selected to produce different tones. Thus a series of eight chime notes composed of selected ones of four different tones from the oscillator 1543 can be produced by the chime circuit. After an eight note sequence, Q9 goes high which is applied to another input of NOR gate 1553 to disable the gate 1553 and prevent discharge of capacitance 1556 to prevent producing another note. Then the counter recycles to Q0 whereupon Q0 goes high to disable the counter 1502.

An OR gate 1566 has one input connected to a power up circuit 1567 and a second input connected to a jumper 1568 which may be connected to ground or to output Q5 of the counter. The output of the OR gate 1566 is connected to the reset input of the counter 1502 to initially set the counter with Q0 high as well as to selectively reset the counter after a programmably determined number of output notes. When the jumper 1568 is connected to the output Q5 of the counter, the counter resets after note 4 and thus the counter only produces a sequence of 4 notes. The output of inverter 1514 is connected to one input of a flip-flop circuit 1570 which has an output connected to one input of an AND gate 1571. The other input of the AND gate 1571 is connected to the counter output Q3 and the output of the AND gate 1571 is connected to a third input of the OR gate 1566 to thus reset the counter 1502 after two notes in the event that a rear pushbutton 1506 is depressed. Similarly, the output of inverter 1515 is connected to an input of a flip-flop 1572 which has an output controlling an AND gate 1573 for applying the Q2 output of the counter 1502 to a fourth input of the OR gate 1566 to thus reset the counter 1502 after a single chime note in the event that the side door push button 1508 is depressed.

Counter outputs Q8 and Q4, line E from an ouput of AND gate 1575 which has its inputs connected to counter output Q2 and the output of the flip-flop 1570, and line F from the output of an AND gate 1576 which has its inputs connected to counter output Q1 and the output of flip-flop 1572 are connected to respective inputs of an OR gate 1578. The gate 1578 through an inverter 1579 operates the analog switch 1528 in the clock oscillator. Normally, the switch 1528 is closed to connect the resistance 1524 in parallel with the resistance 1525 and thus produce a relatively short clock period. However, when one of the inputs to gate 1578 go high, the analog switch 1528 is disabled to disconnect the parallel resistance 1524 and thus double the timing period for the clock oscillator. This results in doubling the chime note period for the end note of each sequence produced by the operation of pushbutton switches 142, 130 and 1508 as well as a doubled time period for note four during an eight note sequence.

Since many variations, modifications and changes in detail may be made to the above described embodiment without departing from the scope and spirit of the invention as set forth in the following claims, it is intended that all matter in the foregoing description and shown in the accompanying drawings be interpreted as illustrative and not in a limiting sense.

What is claimed is:

1. A communication system comprising
a plurality of common lines including an audio line, a control line and a talk-listen line;
a plurality of station units connected to the common lines and each including microphone and speaker means, a talk switch for producing a talk signal on the control line, latch means for being set when each respective talk switch is operated, means for operating each respective microphone and speaker means as speaker means responding to audio signals on the audio line except when each respective talk switch is operated or when a listen signal is present on the talk-listen line while each respective latch means is reset, means for operating the microphone and speaker means as microphone means generating audio signals on the audio line when each respective talk switch is operated or when a listen signal is present on the talk-listen line while each respective latch means is reset, and means for selectively resetting each respective latch means; and
a master control unit connected to the common lines and including means responsive to termination of operation of the talk signal on the control line for producing a listen signal on the talk-listen line.

2. A communication system as claimed in claim 1 wherein the means responsive to termination of operation of the talk signal on the control line includes timing means for producing the listen signal on the talk-listen line for a predetermined duration, and the means for selectively resetting the latch means includes means responsive to termination of the listen signal on the talk-listen line for resetting the latch means.

3. A communication system as claimed in claim 1 wherein the station units each include an end of call switch for producing an end of call signal on the control line, and the means for producing a listen signal on the talk-listen line is responsive to the end of call signal on the control line to terminate the listen signal on the talk-listen line.

4. A communication system as claimed in claim 3 wherein the talk signal and the end of call signal on the control line are represented by different discrete voltages, and the master control unit includes analog-to-digital means for detecting the talk signal and the end of call signal on the control line.

5. A communication system as claimed in claim 1 wherein the master control unit produces a talk signal on the talk-listen line when a talk switch is operated, the listen signal having a different voltage than the talk signal on the talk-listen line; there is included entertainment means for presenting music or the like on the audio line to be broadcast by the station units; and each of the station units includes first volume control means for controlling the volume of program broadcast in the absence of a listen signal and a talk signal on the talk-listen line, and includes second volume control means operated in response to a talk signal on the talk-listen line for controlling the volume broadcast by the calling unit.

6. A communication system comprising
an audio line,
a microphone-speaker,
a first amplifier having its input connected to the audio line,
first switch means operated by a first voltage connecting the output of the first amplifier to the microphone-speaker,
a second amplifier having its output connected to the audio line,
second switch means operated by a first voltage for connecting the input of the second amplifier to the microphone-speaker,
first control line means for receiving a signal of the first voltage for operating one of the first and second switch means, second control line means including inverter means connected to the first control line means for operating the other of the first and second switch means, first and second resistances coupling the respective control line means to inputs of the respective switch means, a series circuit including third and fourth resistances and an interposed capacitance connected between the inputs of the first and second switch means, and first and second diodes connected between the respective plates of the capacitance and the respective first and second control line means for clamping the corresponding capacitance plate to a second voltage on the corresponding control line means indicating an off condition of the corresponding switch means whereby the charge on the capacitance momentarily renders the other switch means inoperative to prevent simultaneous connection of input and output amplifiers to the microphone-speaker.

7. A communication system comprising
means adapted for connection to a pair of telephone lines;
an input line for receiving outgoing signals to be transferred to the telephone lines;
an output line for receiving incoming signals to be transferred thereto from the telephone lines;
first optical isolator means including light generating diode means for being connected across the telephone lines, and including light sensitive transistor means connected to the output line for transferring the incoming signals to the output line;
variable impedance means for being coupled across the telephone line and including second optical isolator means with light generating diode means connected to the input line, and with light sensitive transistor means forming a variable impedance element of the variable impedance means for generating a variable impedance to transfer outgoing signals to the telephone lines;
relay means for selectively connecting the first optical isolator means and the variable impedance means in parallel across the telephone lines;
a plurality of common lines including an audio line and a control line;
a plurality of station units connected to the common lines and each including microphone and speaker means, an intercom talk switch for producing an intercom talk signal on the control line, a phone talk switch for producing a phone talk signal on the control line, means for operating each respective microphone and speaker means as microphone means when either the respective intercom talk switch or the respective phone talk switch is operated to generate audio signals on the audio line, and means for operating each respective microphone and speaker means as speaker means during other conditions; and
a master control unit connected to the common lines, the input line, the output line, and the relay means for operating the relay means and for connecting the input line to the audio line when a phone talk switch is operated, and for connecting the output line to the audio line when the phone talk switch is disengaged.

8. A communication system as claimed in claim 7 wherein the plurality of common lines also includes a talk-listen line;
each of the station units includes latch means which are set when either the respective intercom talk switch or the respective phone talk switch is operated, and the means for operating the microphone and speaker means as speaker means broadcasts audio signals from the audio line except when its respective intercom talk switch or respective phone talk switch is operated or when a listen signal is present on the talk-listen line while the respective latch means is reset; and
the master control unit includes means responsive to termination of an intercom talk signal on the control line for producing a listen signal on the talk-listen line.

9. A communication system as claimed in claim 7 including
a door station unit;
said station units other than the door station unit each including a door talk switch for producing a door talk signal on the control line, and an end of call switch for producing an end of call signal on the control line, each of said means for operating the microphone and speaker means as microphone means being operated when the respective door talk switch is operated;
said master control unit including means connected to the door unit for transmitting audio signals to the door unit from the audio line in response to a door talk signal, and means connected to the door unit for transmitting audio signals from the door unit to the audio line after termination of the door talk signal so that the response from the door unit may be broadcast on the station units.

10. A communication system as claimed in claim 9 wherein the door unit includes a door button switch connected to the master control unit, and the master control unit includes a chime circuit having a variable tone oscillator, oscillator-operated counting means, means responsive to different counts of the counting means for producing different selected tones, variable output amplifier means including a voltage-controlled member for determining output volume, a first capacitance in parallel with the voltage input for controlling rise time of the amplifier output, a second capacitance in series with the voltage input for controlling decay time of the amplifier output, and means for discharging the second capacitance during each count; and the master control unit includes means for transmitting the output of the chime circuit on the audio line in response to the operation of the door button switch.

11. A communication system comprising
line means including an audio line;
a plurality of station units connected to the line means and each including microphone and speaker means, an intercom talk switch, a phone talk switch, means responsive to operation of either the respective intercom talk switch or the respective phone talk switch for operating the respective microphone and speaker means as microphone means for producing audio signals on the audio line, and means normally operating the respective microphone and speaker means as speaker means for broadcasting the audio from the audio line except when its corresponding phone talk or corresponding intercom talk switch is operated;

a phone coupler circuit adapted for connection to a pair of telephone lines and including input means for producing outgoing signals on the telephone lines, and output means for detecting incoming signals on the telephone lines; and master control circuitry connected to the line means, the input means and the output means, and including means responsive to operation of a phone talk switch for connecting the audio line to the input means of the phone coupler circuit, and means responsive to termination of the operation of the phone talk switch for connecting the output means of the phone coupler circuit to the audio line.

12. A communication system as claimed in claim 11 wherein the line means also includes a control line and a talk-listen line;

each of the station units include means for producing corresponding intercom talk and phone talk signals on the control line in response to operation of the respective intercom talk switch or the respective phone talk switch, latch means for being set when the respective intercom talk switch is operated, and said operating means for operating the microphone and speaker means as microphone means includes means for operating the microphone and speaker means as microphone means when a listen signal is present on the talk-listen line while the latch means is reset; and the master control unit includes means responsive to termination of an intercom talk signal on the control line for producing a listen signal on the talk-listen line.

13. A communication system as claimed in claim 11 wherein the phone coupler circuit includes means for detecting a ring signal on the telephone lines, and the master control circuitry includes means responding to the detecting means for producing telephone ringing signals on the audio line.

14. A communication system as claimed in claim 14 wherein the phone coupler circuit includes means for detecting a current in the telephone lines to a telephone station to sense the telephone station coming off-hook, and means responsive to the sensing of the station coming off-hook for disabling connection of the audio line to the input and output means.

* * * * *